United States Patent
Nishikawa et al.

(10) Patent No.: US 11,186,775 B2
(45) Date of Patent: *Nov. 30, 2021

(54) POLYMERIZABLE LIQUID CRYSTAL COMPOSITION, OPTICALLY ANISOTROPIC LAYER, OPTICAL LAMINATE, METHOD FOR PRODUCING OPTICAL LAMINATE, AND IMAGE DISPLAY DEVICE

(71) Applicant: FUJIFILM Corporation, Tokyo (JP)

(72) Inventors: Hideyuki Nishikawa, Minami-Ashigara (JP); Kunihiro Atsumi, Minami-Ashigara (JP); Yutaka Nozoe, Minami-Ashigara (JP); Yuki Nakazawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/686,969

(22) Filed: Nov. 18, 2019

(65) Prior Publication Data

US 2020/0095503 A1 Mar. 26, 2020

Related U.S. Application Data

(63) Continuation of application No. PCT/JP2018/020194, filed on May 25, 2018.

(30) Foreign Application Priority Data

May 26, 2017 (JP) .............................. JP2017-104648
Sep. 6, 2017 (JP) .............................. JP2017-171455

(51) Int. Cl.
| | | |
|---|---|---|
| G02F 1/1333 | (2006.01) | |
| C09K 19/38 | (2006.01) | |
| C09K 19/54 | (2006.01) | |
| G02B 5/30 | (2006.01) | |
| G02F 1/1335 | (2006.01) | |
| H01L 51/52 | (2006.01) | |

(52) U.S. Cl.
CPC ........ *C09K 19/3852* (2013.01); *C09K 19/542* (2013.01); *G02B 5/3016* (2013.01); *G02F 1/133528* (2013.01); *H01L 51/5281* (2013.01)

(58) Field of Classification Search
CPC .. C09K 19/3852; C09K 19/542; C09K 19/52; C09K 19/38; C09K 2019/528; C09K 2019/0448; G02F 1/1333; G02F 1/133528; G02F 1/133633; G02B 5/3016
See application file for complete search history.

(56) References Cited

U.S. PATENT DOCUMENTS

| | | |
|---|---|---|
| 2007/0170394 A1 | 7/2007 | Kawamura et al. |
| 2017/0283701 A1 | 10/2017 | Tamura et al. |
| 2018/0252957 A1 | 9/2018 | Yamamoto et al. |
| 2020/0079885 A1* | 3/2020 | Tamura ..................... C09D 4/06 |
| 2020/0095503 A1* | 3/2020 | Nishikawa ............... C08F 20/10 |

FOREIGN PATENT DOCUMENTS

| | | |
|---|---|---|
| CN | 100572502 C | 12/2009 |
| CN | 107108795 A | 8/2017 |
| JP | 2001-323266 A | 11/2001 |
| JP | 2005-82695 A | 3/2005 |
| JP | 2006-16599 A | 1/2006 |
| JP | 2012-3114 A | 1/2012 |
| JP | 2013-71945 A | 4/2013 |
| JP | 2015-206010 A | 11/2015 |
| JP | 2017-49327 A | 3/2017 |
| JP | 2017-193654 A | 10/2017 |
| JP | 6255636 B1 | 1/2018 |
| JP | 2018-72358 A | 5/2018 |
| WO | WO 2014/199932 A1 | 12/2014 |
| WO | WO 2016/063719 A1 | 4/2016 |
| WO | WO 2016/092844 A1 | 6/2016 |
| WO | WO 2016/140000 A1 | 9/2016 |
| WO | WO 2017/038506 A1 | 3/2017 |
| WO | WO 2017/183682 A1 | 10/2017 |

OTHER PUBLICATIONS

Japanese Office Action, dated Aug. 11, 2020, for corresponding Japanse Application No. 2019-520331. with an English translation.
Chinese Office Action and Search Report for corresponding Chinese Application No. 201880033291.0, dated Mar. 26, 2021, with English translation of the Office Action.
International Preliminary Report on Patentability and English translation of the Written Opinion of the International Searching Authority (Forms PCT/IB/326, PCT/IB/373, and PCT/ISA/237) for International Application No. PCT/JP2018/020194, dated Dec. 5, 2019.
International Search Report (Form PCT/ISA/210) for International Application No. PCT/JP2018/020194, dated Aug. 28, 2018, with English translation.
Korean Office Action, dated Oct. 28, 2020, for corresponding Korean Patent Application No. 10-2019-7031741, with an English translation.

* cited by examiner

*Primary Examiner* — Geraldina Visconti
(74) *Attorney, Agent, or Firm* — Birch, Stewart, Kolasch & Birch, LLP

(57) ABSTRACT

An object of the present invention is to provide a polymerizable liquid crystal composition which has excellent coating properties, is capable of suppressing film thickness unevenness, and has good coating properties for an upper layer coating liquid after being formed as an optically anisotropic layer, an anisotropic layer formed using the same; an optical laminate; a method for producing an optical laminate, and an image display device. The polymerizable liquid crystal composition of the embodiment of the present invention is a polymerizable liquid crystal composition containing a polymerizable liquid crystal compound, a polymerization initiator, and a compound having a monovalent specific group including a cleavage group capable of decomposing by an action of at least one selected from the group consisting of light, heat, an acid, and a base to generate a polar group, in which the specific group has a fluorine atom or a silicon atom on a side closer to a terminal than the cleavage group.

14 Claims, No Drawings

POLYMERIZABLE LIQUID CRYSTAL COMPOSITION, OPTICALLY ANISOTROPIC LAYER, OPTICAL LAMINATE, METHOD FOR PRODUCING OPTICAL LAMINATE, AND IMAGE DISPLAY DEVICE

CROSS-REFERENCE TO RELATED APPLICATIONS

This application is a Continuation of PCT International Application No. PCT/JP2018/020194 filed on May 25, 2018, which claims priority under 35 U.S.C. § 119(a) to Japanese Patent Application No. 2017-104648 filed on May 26, 2017 and Japanese Patent Application No. 2017-171455 filed on Sep. 6, 2017. Each of the above applications is hereby expressly incorporated by reference, in its entirety, into the present application.

BACKGROUND OF THE INVENTION

1. Field of the Invention

The present invention relates to a polymerizable liquid crystal composition, an optically anisotropic layer, an optical laminate, a method for producing an optical laminate, and an image display device.

2. Description of the Related Art

Optical films such as an optical compensation sheet and a phase difference film have been used for various image display devices from the viewpoint of solving image coloration, widening a viewing angle, and the like.

A stretched birefringent film has been used as the optical film, but it has recently been proposed to use an optically anisotropic layer using a liquid crystal compound instead of the stretched birefringent film.

For example, WO2016/092844A discloses a composition for forming an optically anisotropic layer for an under layer in the preparation of an optical laminate having at least two optically anisotropic layers as above, in which the composition contains a polymerizable liquid crystal compound and a predetermined polymer having a partial structure formed by the polymerization of a compound having a fluorine atom ([claim 1], [claim 4], and [claim 11]).

SUMMARY OF THE INVENTION

The present inventors have conducted studies on more rapid formation of a plurality of optically anisotropic layers using the polymerizable liquid crystal composition described in WO2016/092844A, or the like, and have thus found that in a case of using the polymer described in WO2016/092844A or other known fluorine-based surfactants, the coating properties of the polymerizable liquid crystal composition are good and the film thickness unevenness (hereinafter also referred to as a "wind unevenness caused by a drying wind during drying can also be suppressed, but the present inventors have revealed that depending on the polymer or fluorine-based surfactant to be used, the coating properties (hereinafter also referred to as "upper layer coating properties") of the coating liquid (hereinafter also referred to as an "upper layer coating liquid") that forms the upper layer (for example, another optically anisotropic layer and an alignment film) of the formed optically anisotropic layer are deteriorated in some cases.

Therefore, an object of the present invention is to provide a polymerizable liquid crystal composition which has excellent coating properties, is capable of suppressing film thickness unevenness, and has good coating properties with respect to an upper layer coating liquid after being formed as an optically anisotropic layer; an optically anisotropic layer formed using the same; an optical laminate; a method for producing an optical laminate; and an image display device.

The present inventors have conducted extensive studies so as to accomplish the object, and as a result, they have found that by blending a compound which has a monovalent specific group including a cleavage group capable of decomposing by an action of light or the like to generate a polar group and has a fluorine atom or a silicon atom on a side closer to a terminal than the cleavage group in the specific group into a polymerizable liquid crystal composition, the coating properties are excellent, the film thickness unevenness can be suppressed, and the coating properties with respect to the upper layer coating liquid after being formed as an optically anisotropic layer are also good, thereby completing the present invention.

That is, the present inventors have found that it is possible to accomplish the object by the following configurations.

[1] A polymerizable liquid crystal composition comprising:
a polymerizable liquid crystal compound;
a polymerization initiator; and
a compound having a monovalent specific group including a cleavage group capable of decomposing by an action of at least one selected from the group consisting of light, heat, an acid, and a base to generate a polar group,
in which the specific group has a fluorine atom or a silicon atom on a side closer to a terminal than the cleavage group.

[2] The polymerizable liquid crystal composition as described in [1],
in which the compound is a polymer having a repeating unit represented by Formula (1) which will be described later or a repeating unit represented by Formula (2-1) or (2-2) which will be described later.

[3] The polymerizable liquid crystal composition as described in [2],
in which RK in Formulae (1), (2-1), and (2-2) which will be described later is a cleavage group represented by any one of Formula (rk-1), . . . , or (rk-13) which will be described later.

[4] The polymerizable liquid crystal composition as described in any one of [1] to [3],
in which the compound is a polymer having a repeating unit represented by Formula (3) which will be described later.

[5] An optically anisotropic layer formed using the polymerizable liquid crystal composition as described in any one of [1] to [4].

[6] An optical laminate comprising:
the optically anisotropic layer as described in [5]; and
an upper layer provided on the optically anisotropic layer,
in which the optically anisotropic layer and the upper layer are laminated in adjacent to each other.

[7] An optical laminate comprising:
a support;
a first optically anisotropic layer provided on the support; and
a second optically anisotropic layer provided on the first optically anisotropic layer,
in which the first optically anisotropic layer is the optically anisotropic layer as described in [5], and the first optically anisotropic layer and the second optically anisotropic layer are laminated in adjacent to each other.

[8] The optical laminate as described in [7], in which the second optically anisotropic layer is formed using a polymerizable liquid crystal composition containing a polymerizable liquid crystal compound.

[9] A method for producing an optical laminate, for the preparation of the optical laminate as described in [8], comprising:

a first applying step of applying the polymerizable liquid crystal composition as described in any one of [1] to [4] onto a support;

a first optically anisotropic layer forming step of forming a first optically anisotropic layer after the first applying step;

an action performing step of performing an action of at least one selected from the group consisting of light, heat, an acid, and a base;

a second applying step of directly applying a polymerizable liquid crystal composition for forming a second optically anisotropic layer onto the first optically anisotropic layer; and a second optically anisotropic layer forming step of forming a second optically anisotropic layer after the second applying step;

in which the action performing step is a step performed between the first optically anisotropic layer forming step and the second applying step or performed at the same time with the first optically anisotropic layer forming step or the second applying step.

[10] An image display device comprising:

the optically anisotropic layer as described in [5] or the optical laminate as described in any one of [6] to [8].

According to the present invention, it is possible to provide a polymerizable liquid crystal composition which has excellent coating properties, is capable of suppressing film thickness unevenness, and has good coating properties for an upper layer coating liquid after being formed as an optically anisotropic layer; an optically anisotropic layer formed using the same; an optical laminate; a method for producing an optical laminate; and an image display device.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

Furthermore, in the present specification, a numerical value range expressed using "to" means a range that includes the preceding and succeeding numerical values of "to" as the lower limit value and the upper limit value, respectively.

Moreover, in the present specification, $Re(\lambda)$ and $Rth(\lambda)$ represent an in-plane retardation and a thickness-direction retardation at a wavelength of $\lambda$, respectively. For example, $Re(450)$ represents an in-plane retardation at a wavelength of 450 nm. In particular, the wavelength of $\lambda$ is defined as 550 nm unless otherwise specified.

In the present invention, $Re(\lambda)$ and $Rth(\lambda)$ are values measured at a wavelength of $\lambda$ in AxoScan OPMF-1 (manufactured by Opto Science, Inc.).

Specifically, by inputting the average refractive index $((N_x+N_y+N_z)/3)$ and the film thickness (d (μm)) to AxoScan OPMF-1, it is possible to calculate:

Slow axis direction (°)

$$Re(\lambda) = R0(\lambda)$$

$$Rth(\lambda) = ((nx+ny)/2 - nz) \times d.$$

In addition, $R0(\lambda)$ is expressed in a numerical value calculated with AxoScan OPMF-1, but means $Re(\lambda)$.

Moreover, in the present specification, the refractive indices nx, ny, and nz are measured using an Abbe refractometer (NAR-4T, manufactured by Atago Co., Ltd.) and a sodium lamp ($\lambda$=589 nm) as a light source. In addition, in a case where wavelength dependency is measured, the wavelength dependency can be measured with a multi-wavelength Abbe refractometer DR-M2 (manufactured by Atago Co., Ltd.) in combination with an interference filter.

In addition, the values mentioned in Polymer Handbook (JOHN WILEY & SONS, INC.) and the catalogues of various optical films can be used. The values of the average refractive indices of major optical films are exemplified below: cellulose acylate (1.48), a cycloolefin polymer (1.52), polycarbonate (1.59), polymethyl methacrylate (1.49), and polystyrene (1.59).

Moreover, in the present specification, an A-plate is defined as follows.

The A-plate is classified into two types, a positive A-plate and a negative A-plate, and in a case where a refractive index in a slow axis direction (a direction such that the in-plane refractive index is maximized) in a film plane is defined as nx, where a refractive index in a direction in-plane orthogonal to the in-plane slow axis is defined as ny, and a refractive index in the thickness direction is defined as nz, the positive A-plate satisfies a relationship of Formula (A1) and the negative A-plate satisfies a relationship of Formula (A2). In addition, the positive A-plate has a Rth representing a positive value and the negative A-plate has a Rth representing a negative value.

$$nx > ny \cong nz \qquad \text{Formula (A1)}$$

$$ny < nx \cong nz \qquad \text{Formula (A2)}$$

In addition, "≅" encompasses a case where both sides are completely the same as each other as well as a case where the both sides are substantially the same as each other. With regard to being "substantially the same", for example, a case where $(ny-nz) \times d$ (here, d is the thickness of a film) is −10 to 10 nm, and preferably −5 to 5 nm is included in "ny≅nz", and a case where $(nx-nz) \times d$ is −10 to 10 nm, and preferably −5 to 5 nm is also included in "nx≅nz".

Moreover, in the present specification, C-plates are classified into two types, a positive C-plate and a negative C-plate, the positive C-plate satisfies a relationship of Formula (C1) and the negative C-plate satisfies a relationship of Formula (C2). In addition, the positive C-plate has a Rth representing a negative value and the negative C-plate has a Rth representing a positive value.

$$nz > nx \cong ny \qquad \text{Formula (C1)}$$

$$nz < nx \cong ny \qquad \text{Formula (C2)}$$

In addition, "≅" encompasses a case where both sides are completely the same as each other as well as a case where the both sides are substantially the same as each other. With regard to being "substantially the same", for example, a case where $(nx-ny) \times d$ (here, d is the thickness of a film) is 0 to 10 nm, and preferably 0 to 5 nm is also included in "nx≅ny".

[Polymerizable Liquid Crystal Composition]

The polymerizable liquid crystal composition of an embodiment of the present invention (hereinafter also simply referred to as "the liquid crystal composition of the embodiment of the present invention") contains a polymerizable liquid crystal compound, a polymerization initiator, and a compound having a monovalent specific group including a cleavage group capable of decomposing by an action of at least one selected from the group consisting of light, heat, an acid, and a base to generate a polar group (hereinafter also simply referred to as a "specific compound").

In addition, the specific group contained in the specific compound has a fluorine atom or a silicon atom on a side closer to a terminal than the cleavage group.

In the present invention, by blending a specific compound which has a monovalent specific group including a cleavage group capable of decomposing by an action of light or the like to generate a polar group and has a fluorine atom or a silicon atom on a side closer to a terminal than the cleavage group in the specific group into the polymerizable liquid crystal composition as described above, the coating properties are excellent, the film thickness unevenness can be suppressed, and the coating properties with respect to the upper layer coating liquid after being formed as an optically anisotropic layer are also good.

Details thereof are not clear, but are presumed as follows by the present inventors.

That is, it is considered that in a case where the liquid crystal composition of the embodiment of the present invention is applied, by allowing a specific compound having a fluorine atom or a silicon atom to act as a surfactant or a leveling agent, the coating properties are good and the film thickness unevenness can be suppressed.

In addition, it is considered that by performing an action of at least one selected from the group consisting of light, heat, an acid, and a base with respect to the specific compound unevenly distributed on an air interface after forming an optically anisotropic layer using the liquid crystal composition of the embodiment of the present invention, a cleavage group included in the specific group decomposes to generate a polar group, the fluorine atom or the silicon atom present on a side closer to a terminal than the cleavage group leaves, and thus, the coating properties of the upper layer coating liquid are good.

Hereinafter, the respective components of the liquid crystal composition of the embodiment of the present invention will be described in detail.

[Polymerizable Liquid Crystal Compound]

The polymerizable liquid crystal compound contained in the liquid crystal composition of the embodiment of the present invention is not particularly limited, and for example, a compound capable of any one alignment of homeotropic alignment, homogeneous alignment, hybrid alignment, or cholesteric alignment can be used.

Here, liquid crystal compounds are generally classified into rod and discotic types based on their shapes. Further, each type is further classified into low-molecular and high-molecular types. The high-molecular type usually refers to a molecule having a degree of polymerization of 100 or more (Masao Doi, Polymer physics and phase transition dynamics, p. 2, Iwanami Shoten, Publishers, 1992). Although any liquid crystal compound is usable in the present invention, rod-like liquid crystal compound (hereinafter also abbreviated as "CLC") or discotic liquid crystal compound (disc-like liquid crystal compound) (hereinafter also abbreviated as "DLC") are preferably used, and further, a monomer or a relatively low-molecular-weight liquid crystal compound having a degree of polymerization of less than 100 is preferably used.

In addition, specific examples of the polymerizable group contained in the polymerizable liquid crystal compound include an acryloyl group, a methacryloyl group, an epoxy group, and a vinyl group.

By fixing such a polymerizable liquid crystal compound, it is possible to fix the alignment of the liquid crystal compound. In addition, after fixing the liquid crystal compound is fixed by the polymerization, it is not necessary to already exhibit liquid crystallinity.

As the rod-like liquid crystal compound, for example, the compounds described in claim 1 of JP1999-513019A (JP-H11-513019A) and paragraphs [0026] to [0098] of JP2005-289980A can be preferably used, and as the discotic liquid crystal compound, for example, the compounds described in paragraphs [0020] to [0067] of JP2007-108732A or paragraphs [0013] of JP2010-244038A can be preferably used, but there is no limitation thereto.

In the present invention, as the polymerizable liquid crystal compound, a reciprocal wavelength dispersible liquid crystal compound can be used.

Here, in the present specification, the "reciprocal wavelength dispersible" liquid crystal compound means that the liquid crystal compound means that a Re value becomes equal or higher as a measurement wavelength is increased in a case where an in-plane retardation (Re) value at a specific wavelength (visible light range) of a phase difference film prepared using the liquid crystal compound is measured.

The reciprocal wavelength dispersible liquid crystal compound is not particularly limited as long as it is capable of forming a reciprocal wavelength dispersible film as described above, and for example, the compounds represented by General Formula (I) described in JP2008-297210A (particularly, the compounds described in paragraph Nos. [0034] to [0039]), the compounds represented by General Formula (I) described in JP2010-084032A (particularly, the compounds described in paragraph Nos. [0067] to [0073]), the compounds represented by General Formula (I) described in JP2016-081035A (particularly, the compounds described in paragraph Nos. [0043] to [0055]), or the like can be used.

[Specific Compound]

The specific compound contained in the liquid crystal composition of the embodiment of the present invention is a compound having a monovalent specific group including a cleavage group capable of decomposing by an action of at least one selected from the group consisting of light, heat, an acid, and a base to generate a polar group.

Furthermore, the specific compound has a specific group which has a fluorine atom or a silicon atom on a side closer to a terminal than the cleavage group.

Here, the polar group refers to a group having at least one or more heteroatoms or halogen atoms, and specific examples thereof include a hydroxyl group, a carbonyl group, a carboxy group, an amino group, a nitro group, an ammonium group, and a cyano group. Among these, the hydroxyl group or the carboxy group is preferable.

In addition, the cleavage group capable of generating a polar group refers to a group capable of generating the above-mentioned polar group by cleavage, but in the present invention, it also includes a group capable of undergoing a reaction with an oxygen molecule after radical cleavage to produce a polar group.

In the present invention, for a reason that the film thickness unevenness (wind unevenness) can further be suppressed, the specific compound is preferably a polymer having a repeating unit represented by Formula (1) or a repeating unit represented by Formula (2-1) or (2-2), and among these, the polymer having the repeating unit represented by Formula (1) is more preferable.

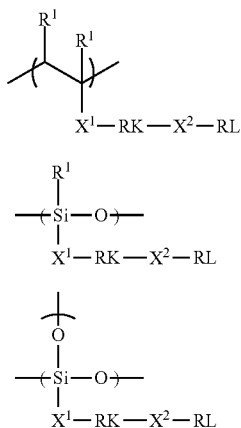

In Formulae (1) and (2-1), $R^1$ represents a hydrogen atom or an alkyl group having 1 to 3 carbon atoms, and a plurality of $R^1$'s in Formula (1) may be the same as or different from each other.

$R^1$ is preferably a hydrogen atom or a methyl group.

Moreover, in Formulae (1), (2-1), and (2-2), $X^1$ and $X^2$ each independently represent a single bond or a divalent linking group, RK represents a cleavage group, and RL represents a monovalent organic group including a fluorine atom or a silicon atom.

Examples of the divalent linking group represented by each of $X^1$ and $X^2$ in Formulae (1), (2-1), and (2-2) include at least one or more groups selected from the group consisting of a linear, branched, or cyclic alkylene group having 1 to 10 carbon atoms, which may have a substituent, an arylene group having 6 to 12 carbon atoms, which may have a substituent, an ether group (—O—), a carbonyl group (—C(=O)—), and an imino group (—NH—) which may have a substituent.

Here, examples of the substituent which may be contained in the alkylene group, the arylene group, and the imino group include an alkyl group, an alkoxy group, a halogen atom, and a hydroxyl group.

As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and a methoxy group or an ethoxy group is particularly preferable.

Examples of the halogen atom include a fluorine atom, a chlorine atom, a bromine atom, and an iodine atom, and among these, the fluorine atom or the chlorine atom is preferable.

With regard to the linear, branched, or cyclic alkylene group having 1 to 10 carbon atoms, specific examples of the linear alkylene group include a methylene group, an ethylene group, a propylene group, a butylene group, a pentylene group, a hexylene group, and a decylene group.

Furthermore, specific examples of the branched alkylene group include a dimethylmethylene group, a methylethylene group, a 2,2-dimethylpropylene group, and a 2-ethyl-2-methylpropylene group.

In addition, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group, and among these, the cyclohexylene group is preferable.

Specific examples of the arylene group having 6 to 12 carbon atoms include a phenylene group, a xylylene group, a biphenylene group, a naphthylene group, and a 2,2'-methylenebisphenyl group, and among these, the phenylene group is preferable.

Examples of the cleavage group represented by RK in Formulae (1), (2-1), and (2-2) include a cleavage group (bond) represented by any one of Formula (rk-1), . . . or (rk-13).

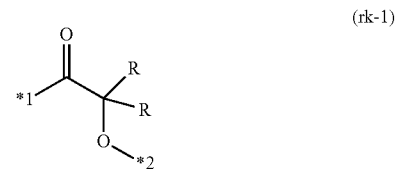

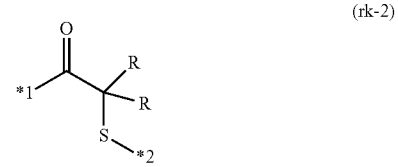

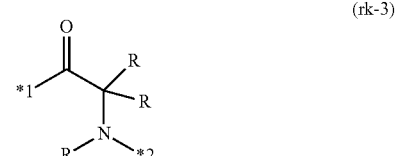

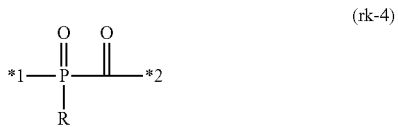

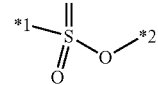

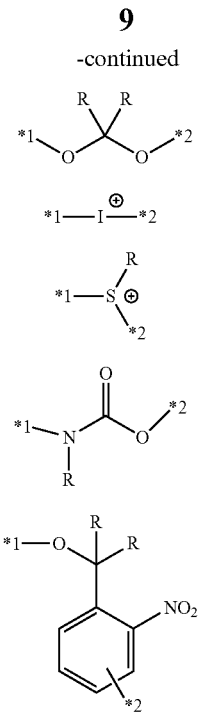

In Formulae (rk-1) to (rk-13), *1 represents a binding position to any one of $X^1$ or $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

Here, examples of the monovalent organic group represented by R include a chained or cyclic alkyl group having 1 to 20 carbon atoms and an aryl group having 6 to 20 carbon atoms, which may have a substituent.

Moreover, the anion moieties in Formulae (rk-10) and (rk-11) are not particularly limited since they do not affect the cleavage, and can be used in any of inorganic anions and organic anions.

Specific examples of the inorganic anion include halide ions such as a chloride ion and a bromide ion; and sulfonate anions.

Specific examples of the organic anion include carboxylate anions such as an acetate anion; and organic sulfonate anions such as a methanesulfonate anion and a paratoluenesulfonate anion.

In the present invention, among these cleavage groups, in a case of performing cleavage using light, the cleavage group represented by Formula (rk-1) is preferable from the viewpoint of quantum efficiency, and in a case of performing cleavage using an acid, the cleavage group represented by Formula (rk-9) is preferable from the viewpoint of a cleavage rate.

Examples of the monovalent organic group including a fluorine atom or a silicon atom represented by RL in Formulae (1), (2-1), and (2-2) include an alkyl group having 1 to 20 carbon atoms or an alkenyl group having 2 to 20 carbon atoms, in which at least one carbon atom has a fluorine atom as a substituent.

Examples of the polymer repeating unit represented by Formula (1) include polymers represented by the following formulae. Further, in the following formulae, "Cf" represents an alkyl group having 1 to 20 carbon atoms or an alkenyl group having 2 to 20 carbon atoms, in which at least one carbon atom has a fluorine atom as a substituent.

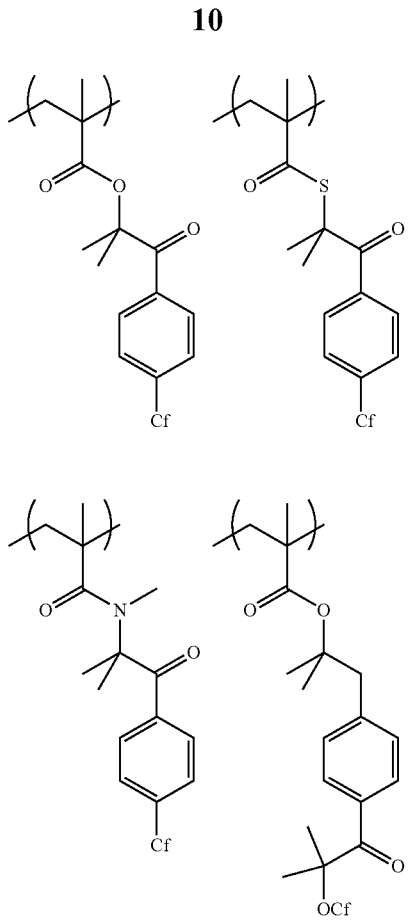

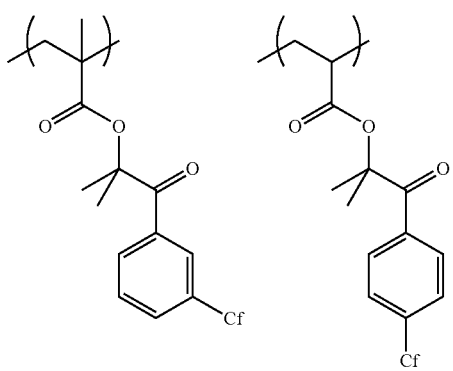

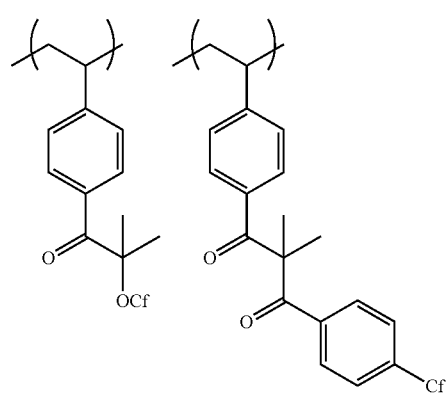

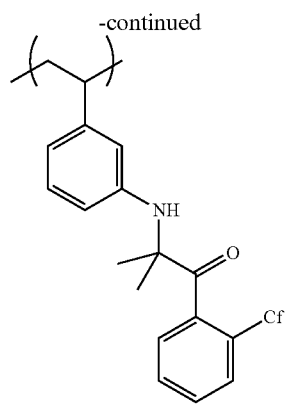
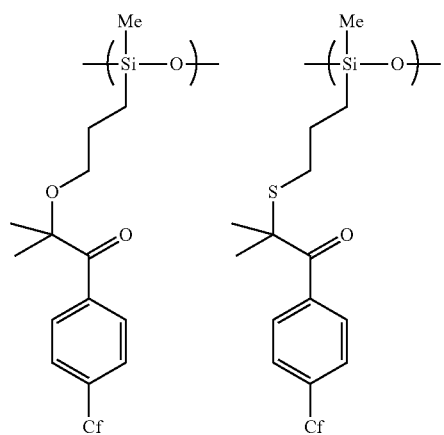
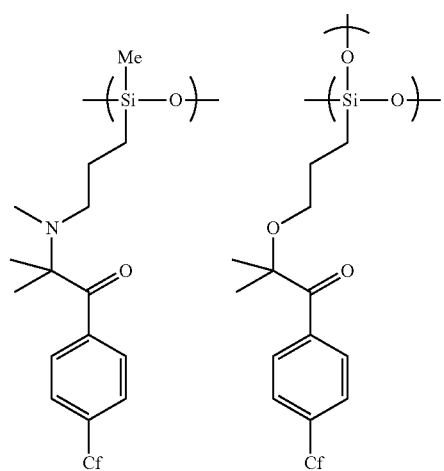
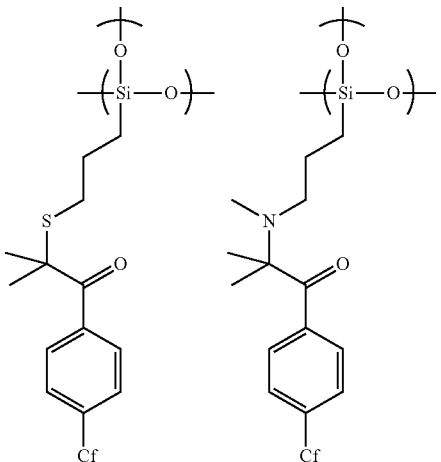
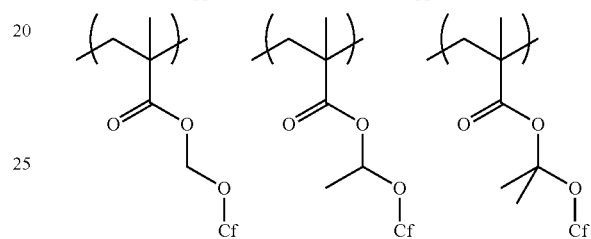
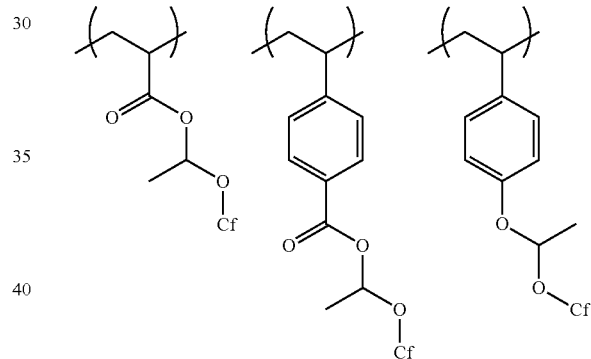
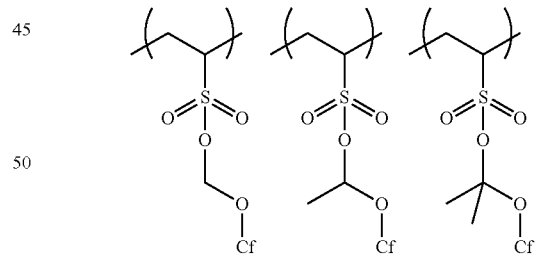
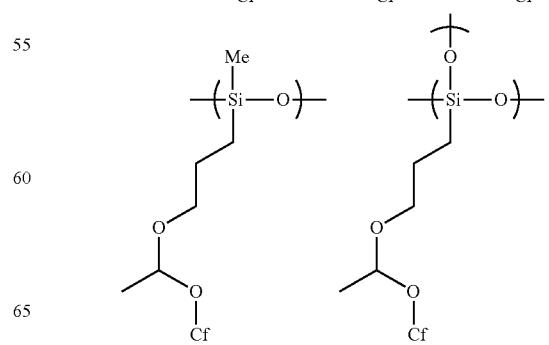

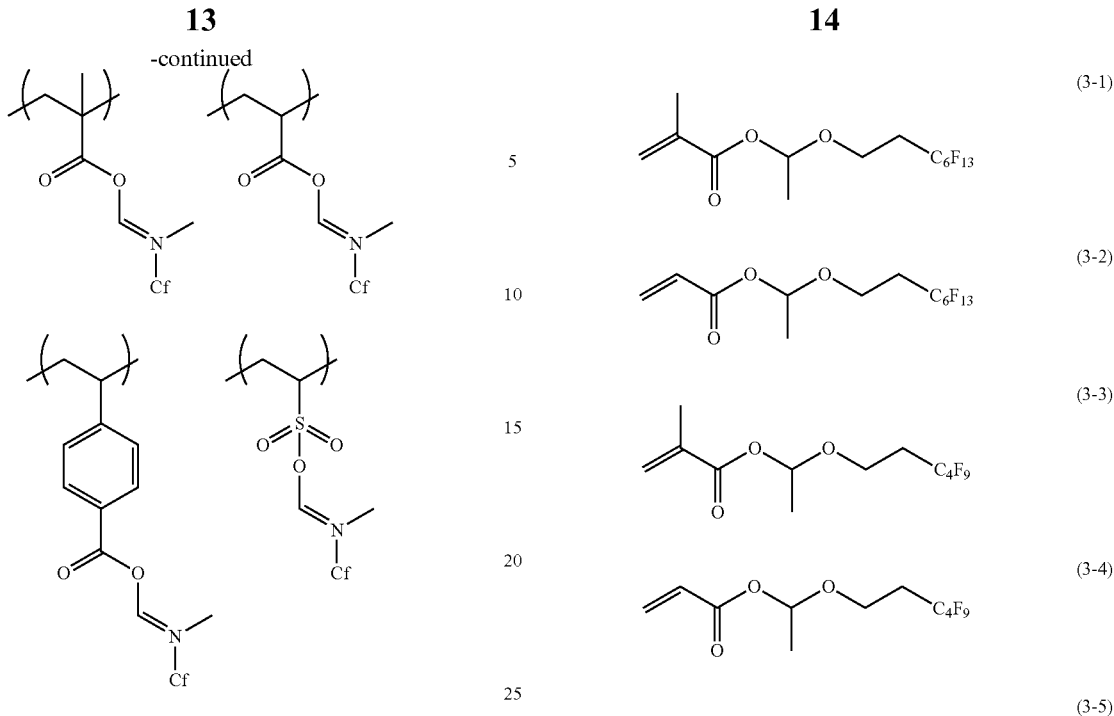

In the present invention, in a case of cleavage using an acid, from the viewpoints of a cleavage rate and ease in synthesis, the specific compound is preferably a polymer having a repeating unit represented by Formula (3).

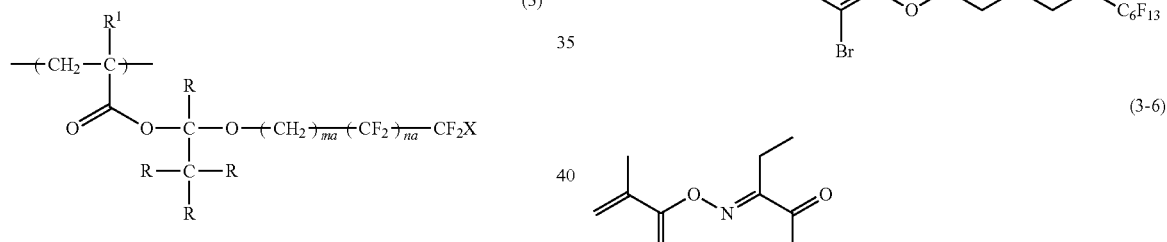

In Formula (3), $R^1$ represents a hydrogen atom or an alkyl group having 1 to 3 carbon atoms, R represents a hydrogen atom or a monovalent organic group, X represents a hydrogen atom or a fluorine atom, ma and na each independently represent an integer of 1 to 20, and a plurality of R's may be the same as or different from each other.

Here, examples of the monovalent organic group represented by R include a chained or cyclic alkyl group having 1 to 20 carbon atoms, and an aryl group having 6 to 20 carbon atoms, which may have a substituent.

$R^1$ in Formula (3) is preferably a hydrogen atom or a methyl group.

Furthermore, R in Formula (3) is preferably a hydrogen atom.

Moreover, ma in Formula (3) is preferably 1 or 2, and na is preferably 3 to 7.

In addition, X in Formula (3) is preferably a fluorine atom.

Examples of the repeating unit represented by Formula (3) include a repeating unit obtained by the polymerization of any one of monomers represented by Formulae (3-1) to (3-6).

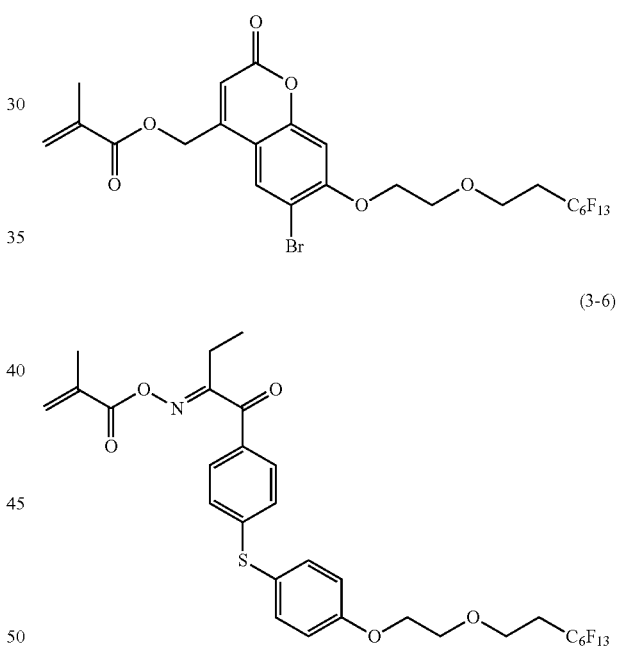

The weight-average molecular weight (Mw) of such a specific compound is preferably 1,000 to 500,000, more preferably 1,500 to 400,000, and particularly preferably 2,000 to 300,000.

Furthermore, the number-average molecular weight (Mn) of the specific compound is preferably 500 to 250,000, more preferably 1,000 to 200,000, and particularly preferably 1,500 to 150,000.

Moreover, the dispersity (Mw/Mn) of the specific compound is preferably 1.00 to 20.00, more preferably 1.00 to 18.00, and particularly preferably 1.00 to 16.00.

In addition, the weight-average molecular weight and the number-average molecular weight are each a value measured under the following conditions by means of gel permeation chromatography (GPC).

[Eluent] Tetrahydrofuran (THF)
[Name of device] Ecosec HLC-8220 GPC (manufactured by Tosoh Corporation)
[Column] TSKgel Super HZM-H, TSKgel Super HZ4000, and TSKgel Super HZM200 (manufactured by Tosoh Corporation)
[Column temperature] 40° C.
[Flow rate] 50 ml/min In the present invention, the content of the specific compound contained in the liquid crystal composition of the embodiment of the present invention is preferably 0.1 to 10 parts by mass, and more preferably 0.5 to 5 parts by mass with respect to 100 parts by mass of the above-mentioned polymerizable liquid crystal compound.

[Polymerization Initiator]

The polymerization initiator contained in the liquid crystal composition of the embodiment of the present invention is not particularly limited, but depending on the type of the polymerization reaction, examples of the polymerization initiator include a thermal polymerization initiator and a photopolymerization initiator.

In the present invention, a photopolymerization initiator capable of initiating a polymerization reaction by irradiation with ultraviolet rays is preferable.

Examples of the photopolymerization initiator include α-carbonyl compounds (described in U.S. Pat. Nos. 2,367,661A and 2,367,670A), acyloin ethers (described in U.S. Pat. No. 2,448,828A), aromatic acyloin compounds substituted by α-hydrocarbon (described in U.S. Pat. No. 2,722,512A), polynuclear quinone compounds (described in U.S. Pat. Nos. 3,046,127A and 2,951,758A), combinations of triarylimidazole dimers and p-aminophenyl ketones (described in U.S. Pat. No. 3,549,367A), acridine and phenazine compounds (described in JP1985-105667A (JP-S60-105667A) and U.S. Pat. No. 4,239,850A), oxadiazole compounds (described in U.S. Pat. No. 4,212,970A), and acylphosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

[Photoacid Generator]

In a case where the above-mentioned specific compound is a compound having a monovalent specific group including a cleavage group capable of decomposing by an action of an acid to generate a polar group, it is preferable that the liquid crystal composition of the embodiment of the present invention contains a photoacid generator.

The photoacid generator is preferably a compound which responds to actinic rays at a wavelength of 300 nm or more and preferably at a wavelength of 300 to 450 nm to generate an acid, but there is no limitation in the chemical structure thereof. In addition, with regard to a photoacid generator which does not directly respond to actinic rays at a wavelength of 300 nm or more, any of compounds which respond to actinic rays at a wavelength of 300 nm or more to generate an acid as used in combination with a sensitizer can be preferably used in combination with the sensitizer. As the photoacid generator used in the present invention, a photoacid generator capable of generating an acid having a pKa of 4 or less is preferable, a photoacid generator capable of generating an acid having a pKa of 3 or less is more preferable, and a photoacid generator capable of generating an acid having a pKa of 2 or less is the most preferable. In the present invention, the pKa basically refers to a pKa in water at 25° C. In a case where the pKa cannot be measured in water, the pKa refers to a value obtained by measuring the pKa by chaining the water to a solvent suitable for measurement. Specifically, reference can be made to the pKa described in Handbook of Chemistry or the like. As the acid having a pKa of 3 or less, sulfonic acid or phosphonic acid is preferable, and the sulfonic acid is more preferable.

Examples of the photoacid generator include an onium salt compound, trichloromethyl-s-triazines, a sulfonium salt, an iodonium salt, quaternary ammonium salts, a diazomethane compound, an imide sulfonate compound, and an oxime sulfonate compound. Among these, the onium salt compound, the imide sulfonate compound, or the oxime sulfonate compound is preferable, and the onium salt compound or the oxime sulfonate compounds is particularly preferable. The photoacid generator may be used singly or in combination of two or more kinds thereof.

[Solvent]

It is preferable that the liquid crystal composition of the embodiment of the present invention contains a solvent from the viewpoint of workability for forming an optically anisotropic layer.

Specific examples of the solvent include ketones (for example, acetone, 2-butanone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide), and these may be used singly or in combination of two or more kinds thereof.

[Optically Anisotropic Layer]

The optically anisotropic layer of an embodiment of the present invention is an optically anisotropic film formed using the above-mentioned liquid crystal composition of the present invention.

Examples of a method for forming the optically anisotropic film include a method in which the above-mentioned liquid crystal composition of the present invention is used to create a desired alignment state and the alignment is fixed by polymerization.

In addition, the polymerization conditions are not particularly limited, but in the polymerization by irradiation with light, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. In addition, in order to promote a polymerization reaction, the polymerization may be performed under heating conditions.

[Optical Laminate]

The optical laminate of an embodiment of the present invention is an optical laminate having the optically anisotropic layer of the embodiment of the present invention and an upper layer provided on the optically anisotropic layer, in which the optically anisotropic layer and the upper layer are laminated in adjacent to each other.

Here, the upper layer is not particularly limited, examples thereof include another optically anisotropic layer and an alignment film, but the upper layer is preferably another optically anisotropic layer of the embodiment of the present invention.

In addition, the optical laminate of the embodiment of the present invention preferably has a support that supports the optically anisotropic layer of the embodiment of the present invention.

That is, suitable aspects of the optical laminate of the embodiment of the present invention include an optical laminate having a support, a first optically anisotropic layer provided on the support (hereinafter also simply referred to as a "first optically anisotropic layer" and a second optically anisotropic layer provided on the first optically anisotropic layer (hereinafter also simply referred to as a "second optically anisotropic layer"), in which the first optically anisotropic layer is the above-mentioned optically anisotropic layer of the embodiment of the present invention, and the first optically anisotropic layer and the second optically anisotropic layer are laminated in adjacent to each other. Hereinafter, suitable aspects of the optical laminate of the embodiment of the present invention will be described in detail.

[Support]

Examples of the support include a glass substrate and a polymer film.

Examples a material for the polymer film include cellulose-based polymers; acrylic polymers having an acrylic acid ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers containing a mixture of these polymers.

The thickness of the substrate is not particularly limited, but is preferably 5 to 200 µm, more preferably 10 to 100 µm, and still more preferably 20 to 90 µm.

[First Optically Anisotropic Layer]

The first optically anisotropic layer is the above-mentioned optically anisotropic layer of the embodiment of the present invention.

In the present invention, the thickness of the first optically anisotropic layer is not particularly limited, but is preferably 0.1 to 10 µm, and more preferably 0.5 to 5 µm.

[Second Optically Anisotropic Layer]

The second optically anisotropic layer is not particularly limited as long as it is an optically anisotropic layer different from the first optically anisotropic layer, and a known optically anisotropic layer can be used.

The second optically anisotropic layer is preferably formed using a polymerizable liquid crystal composition containing a polymerizable liquid crystal compound.

In addition, examples of the polymerizable liquid crystal composition for forming the second optically anisotropic layer include a composition formed by blending the polymerization initiator and the solvent as described above, and optional additives (for example, a surfactant and an adhesion improver), excluding the above-mentioned specific compound from the liquid crystal composition of the embodiment of the present invention.

In the present invention, the thickness of the second optically anisotropic layer is not particularly limited, but is preferably 0.1 to 10 µm, and more preferably 0.5 to 5 µm.

[Method for Producing Optical Laminate]

The method for producing an optical laminate of an embodiment of the present invention is a method for preparing a suitable aspect of the above-mentioned optical laminate of the embodiment of the present invention, which includes a first applying step of applying the above-mentioned liquid crystal composition of the embodiment of the present invention onto the above-mentioned support; a first optically anisotropic layer forming step of forming a first optically anisotropic layer after the first applying step; an action performing step of performing an action of at least one selected from the group consisting of light, heat, an acid, and a base; a second applying step of directly applying a polymerizable liquid crystal composition for forming a second optically anisotropic layer onto the first optically anisotropic layer; and a second optically anisotropic layer forming step of forming a second optically anisotropic layer after the second applying step.

In addition, in the method for producing an optical laminate of the embodiment of the present invention, the action performing step is a performed between the first optically anisotropic layer forming step and the second applying step or performed at the same time with the first optically anisotropic layer forming step or the second applying step.

[First Applying Step]

The first applying step is a step of applying the above-mentioned liquid crystal composition of the embodiment of the present invention onto the above-mentioned support.

A method for applying the liquid crystal composition of the embodiment of the present invention is not particularly limited, and specific examples of the applying method include a spin coating method, an air knife coating method, a curtain coating method, a roller coating method, a wire bar coating method, a gravure coating method, and a die coating method.

[First Optically Anisotropic Layer Forming Step]

The first optically anisotropic layer forming step is a step of forming a first optically anisotropic layer after the first applying step, and the first optically anisotropic layer can be formed by subjecting a coating film obtained in the first applying step to a curing treatment (irradiation with ultraviolet rays (light irradiating treatment) or a heating treatment).

In addition, the conditions for the curing treatment are not particularly limited, but in the polymerization by irradiation with light, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$.

In addition, in order to promote a polymerization reaction, the polymerization may be performed under heating conditions.

[Action Performing Step]

The action performing step is a step of performing an action of at least one selected from the group consisting of light, heat, an acid, and a base.

Furthermore, the action performing step is a step performed between the first optically anisotropic layer forming step and the second applying step or performed at the same time with the first optically anisotropic layer forming step or the second applying step from the viewpoint of securing the coating properties in a case of forming the second optically anisotropic layer as an upper layer.

Here, the expression "between the first optically anisotropic layer forming step and the second applying step" refers to performing an action performing step (for example, a step of performing an action of light) before subjecting a first optically anisotropic layer formed in the first optically anisotropic layer forming step (for example, thermal polymerization) to an action performing step (for example, a step of performing an action of light) before the second applying step.

Moreover, the expression "at the same time with the first optically anisotropic layer forming step" refers to performing the step of forming the first optically anisotropic layer, for example, a step of forming a first optically anisotropic layer by polymerization of olefin-based monomers through generation of photoradicals, polymerization of epoxy monomers through generation of a photoacid, or the like at the same time with the action performing step (for example, a step of performing an action of light). That is, it means that the light used for the polymerization of the binder layer and the light used for the cleavage cause two actions at the same time.

In addition, the expression "at the same time with the second applying step" refers to performing the action performing step (for example, a step of performing an action of heat) at the same time as a first optically anisotropic layer formed in the step of the first optically anisotropic layer forming step (for example, photopolymerization) is subjected to the second applying step.

Among those, it is preferable to perform an action of light and thus, perform the second applying step at the same time with the first optically anisotropic layer forming step from the viewpoint of simplification of a process.

Incidentally, examples of a method for performing an action of light include a method in which the first optically anisotropic layer is irradiated with ultraviolet rays. It is possible to use an ultraviolet ray-emitting lamp such as a high-pressure mercury lamp and a metal halide lamp, or the like as a light source. In addition, the irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$.

Furthermore, examples of a method for performing an action of heat include a method in which the first optically anisotropic layer is heated. A heating temperature is preferably 50° C. to 200° C., more preferably 60° C. to 150° C., and particularly preferably 70° C. to 130° C.

Moreover, examples of a method for performing an action of an acid include a method in which an acid is added to the first optically anisotropic layer in advance, a method in which a photoacid generator is added to the first optically anisotropic layer and an acid is generated using light as a trigger, and a method in which a thermal acid generator is added to the first optically anisotropic layer, and an acid is generated using light as a trigger. Among these, the methods using the photoacid generator and the thermal acid generator are preferable.

In addition, examples of a method for performing an action of a base include a method in include a method in which a base is added to the first optically anisotropic layer in advance, a method in which a photoacid generator is added to the first optically anisotropic layer and a base is generated using light as a trigger, and a method in which a thermal acid generator is added to the first optically anisotropic layer, and a base is generated using light as a trigger. Among these, the methods using the photoacid generator and the thermal acid generator are preferable.

[Second Applying Step]

The second applying step is a step of directly applying a polymerizable liquid crystal composition for forming a second optically anisotropic layer onto the first optically anisotropic layer.

A method for applying the polymerizable liquid crystal composition for forming a second optically anisotropic layer is not particularly limited, and examples thereof include the same method as in the first applying step.

[Second Optically Anisotropic Layer Forming Step]

The second optically anisotropic layer forming step is a step of forming a second optically anisotropic layer after the second applying step, and the second optically anisotropic layer can be formed by subjecting a coating film obtained in the second applying step to a curing treatment (irradiation with ultraviolet rays (light irradiating treatment) or a heating treatment).

In addition, the conditions for the curing treatment are not particularly limited, but it is preferable to use ultraviolet rays in polymerization by irradiation with light. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. Further, in order to promote the polymerization reaction, the polymerization may be performed under heating conditions.

[Image Display Device]

The image display device of an embodiment of the present invention is an image display device having the optically anisotropic layer of the embodiment of the present invention or the optical laminate of the embodiment of the present invention.

The display element used in the image display device of the embodiment of the present invention is not particularly limited, and examples thereof include a liquid crystal cell, an organic electroluminescence (hereinafter abbreviated as "EL") display panel, and a plasma display panel.

Among those, the liquid crystal cell or the organic EL display panel is preferable, and the liquid crystal cell is more preferable. That is, as the image display device of the embodiment of the present invention, a liquid crystal display device using a liquid crystal cell as a display element or an organic EL display device using an organic EL display panel as a display element is preferable.

[Liquid Crystal Display Device]

The liquid crystal display device as an example of the image display device of the embodiment of the present invention is a liquid crystal display device having the optically anisotropic layer of the embodiment of the present invention or the optical laminate of the embodiment of the present invention as described above, and a liquid crystal cell.

Hereinafter, the liquid crystal cell constituting the liquid crystal display device will be described in detail.

<Liquid Crystal Cell>

The liquid crystal cell which is used in the liquid crystal display device is preferably of a vertical alignment (VA) mode, an optically compensated bend (OCB) mode, an in-plane-switching (IPS) mode, or a twisted nematic (TN) mode but there is no limitation thereto.

In a TN mode liquid crystal cell, rod-like liquid crystalline molecules (rod-like liquid crystal compounds) are aligned substantially horizontally in a case in which no voltage is applied and are further aligned in a twisted manner in a range of 60° to 120°. The TN mode liquid crystal cell is most often used in a color TFT liquid crystal display device and is described in many literatures.

In a VA mode liquid crystal cell, rod-like liquid crystalline molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystalline molecules are aligned substantially vertically in a case in which no voltage is applied and are aligned substantially horizontally in a case in which a voltage is applied, (2) a multi-domain VA mode (multi-domain vertical alignment (MVA) mode) liquid crystal cell for enlarging the viewing angle (SID97, Digest of Tech. Papers (Proceedings) 28 (1997) 845), (3) a liquid crystal cell in a mode (axially symmetric aligned microcell (n-ASM mode)) in which rod-like liquid crystalline molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a super ranged viewing by vertical alignment (SURVIVAL) mode liquid crystal cell (presented in liquid crystal display (LCD) International 98). In addition, the liquid crystal cell may be of any of a patterned vertical alignment (PVA) type, an optical alignment type, and a polymer-sustained alignment (PSA) type. Details of these modes are described in JP2006-215326A and JP2008-538819A.

In an IPS mode liquid crystal cell, rod-like liquid crystalline molecules are aligned substantially parallel with respect to a substrate and application of an electric field parallel to the substrate surface causes the liquid crystal molecules to respond planarly. The IPS mode displays black in a case in which no electric field is applied and a pair of upper and lower polarizing plates have absorption axes which are orthogonal to each other. A method of improving the viewing angle by reducing light leakage during black display in an oblique direction using an optical compensation sheet is described in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display panel which is one example of the image display device of the embodiment of the present invention include an aspect of an organic EL display panel which has a polarizer, the optically anisotropic layer of the embodiment of the present invention or the optical laminate of the embodiment of the present invention, and an organic EL display in this order from the viewing side.

<Polarizer>

The polarizer is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. As the iodine-based polarizer and the dye-based polarizer, there are a coating type polarizer and a stretching type polarizer, both of which can be applied, but a polarizer prepared by allowing polyvinyl alcohol to adsorb iodine or a dichroic dye and performing stretching is preferable.

In addition, examples of a method for obtaining a polarizer by performing stretching and dyeing in a state of a laminated film in which a polyvinyl alcohol layer is formed on a base material include the methods disclosed in JP5048120B, JP5143918B, JP4691205B, JP4751481B, and JP4751486B, and known technologies related to these polarizers can also be preferably used.

A polarizer in which thin films having different birefringence are laminated, a wire grid type polarizer, a polarizer in which a cholesteric liquid crystal having a selective reflection range and a ¼ wavelength plate are combined, or the like is used as the reflective type polarizer.

Among these, from the viewpoint that the adhesiveness is more excellent, a polarizer including a polyvinyl alcohol-based resin (a polymer including —$CH_2$—CHOH— as a repeating unit, in particular, at least one selected from the group consisting of polyvinyl alcohol and an ethylene-vinyl alcohol copolymer) is preferable.

The thickness of the polarizer is not particularly limited, but is preferably 3 μm to 60 μm, more preferably 5 μm to 30 μm, and still more preferably 5 μm to 15 μm.

<Organic EL Display Panel>

The organic EL display panel is a member which forms a light emitting layer or a plurality of organic compound thin films including the light emitting layer between a pair of electrodes, that is, an anode and a cathode, and may have, in addition to the light emitting layer, a hole injecting layer, a hole transporting layer, an electron injecting layer, an electron transporting layer, a protective layer, or the like, and each of these layers may comprise different functions. Each of various materials can be used to form each of the layers.

EXAMPLES

Hereinafter, the present invention will be described in more detail with reference to Examples. The materials, the amounts to materials used, the ratios, the treatment details, the treatment procedure, or the like shown in the following Examples can be modified as appropriate while not departing from the spirit of the present invention. Therefore, the scope of the present invention will not be restrictively interpreted by the following Examples.

[Preparation of Support]

A cellulose acylate film (TD40UL, manufactured by Fujifilm Co., Ltd.) was passed through a dielectric heating roll at a temperature of 60° C. to raise the temperature of the film surface to 40° C., and then an alkali solution having the following composition was applied onto one surface of the film at a coating amount of 14 ml/m² using a bar coater, followed by heating at 110° C.

Subsequently, the film was transported for 10 seconds under a steam-type far-infrared heater manufactured by Noritake Co., Ltd.

Then, pure water was applied thereonto at 3 ml/m² using the same bar coater.

Subsequently, after repeating washing with water using a fountain coater and dehydration using an air knife three times, the film was transported to a drying zone at 70° C. for 10 seconds and dried to prepare a cellulose acylate film which had been subjected to an alkali saponification treatment, and the cellulose acylate film was used as a support.

| Composition of alkali solution | |
| --- | --- |
| Potassium hydroxide | 4.7 parts by mass |
| Water | 15.8 parts by mass |
| Isopropanol | 63.7 parts by mass |
| Surfactant ($C_{14}H_{29}O(CH_2CH_2O)_{20}H$) | 1.0 part by mass |
| Propylene glycol | 14.8 parts by mass |

[Formation of Alignment Layer Y1]

An alignment layer coating liquid having the following composition was continuously applied onto the cellulose acylate film which had been subjected to an alkali saponification treatment as described above, with a #14 wire bar. After the application, the film was dried with hot air at 60° C. for 60 seconds and further with hot air at 100° C. for 120 seconds to form an alignment layer Y1. In addition, in the following composition, the "polymerization initiator (IN1)" represents a photopolymerization initiator (IRGACURE 2959, manufactured by BASF).

| Composition of alignment layer coating liquid | |
|---|---|
| Modified polyvinyl alcohol below | 10.0 parts by mass |
| Water | 371.0 parts by mass |
| Methanol | 119.0 parts by mass |
| Glutaraldehyde | 0.5 parts by mass |
| Polymerization initiator (IN1) | 0.3 parts by mass |

(In the following structural formula, the ratio is a molar ratio.)

Modified polyvinyl alcohol

[Formation of Alignment Layer Y2]

An alignment layer coating liquid having the composition was continuously applied onto the cellulose acylate film which had been subjected to an alkali saponification treatment as described above, with a #14 wire bar. After the application, the film was dried with hot air at 60° C. for 60 seconds and further with hot air at 100° C. for 120 seconds.

Subsequently, the coating film after drying was continuously subjected to a rubbing treatment to form an alignment layer Y2. At this time, the longitudinal direction of the long film was set to be in parallel with the transporting direction and the axis of rotation of the rubbing roller with respect to the longitudinal direction of the film was set to be in a 90° direction clockwise.

Example 1

<Synthesis of Specific Compound K1>

A monomer was synthesized according to the following scheme with reference to JP5983628B, and thus, a specific compound K1 represented by Formula K1 was synthesized. The weight-average molecular weight (Mw) of the synthesized specific compound K1 was 33,000.

In addition, in the following scheme, "V-70" represents 2,2'-azobis(4-methoxy-2,4-dimethylvaleronitrile) (manufactured by Wako Pure Chemical Industries, Ltd.) and "MOI" represents 2-isocyanatoethyl methacrylate (Karenz MOI (registered trademark), manufactured by Showa Denko K. K.).

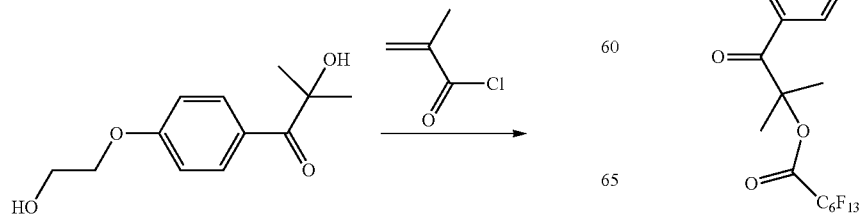

-continued

K1

[Formation of Optically Anisotropic Layer]

The following rod-like liquid crystal compound A (80 parts by mass), the following rod-like liquid crystal compound B (20 parts by mass), a photopolymerization initiator (IRGACURE 907, manufactured by BASF) (3 parts by mass), a sensitizer (KAYACURE DETX, manufactured by Nippon Kayaku Co., Ltd.) (1 part by mass), the following horizontally aligning agent A (1 part by mass), the following vertically aligning agent B (0.5 parts by mass), and the above-mentioned specific compound K1 (2.0 parts by mass) were dissolved in 215 parts by mass of methyl ethyl ketone to prepare a solution for forming an optically anisotropic layer.

The prepared solution for forming an optically anisotropic layer was applied onto the above-mentioned alignment layer Y1 with a #3.0 wire bar, heated at 70° C. for 2 minutes, cooled to 40° C., and then irradiated with ultraviolet rays at an irradiation dose of 300 mJ/cm$^2$ using an air-cooling metal halide lamp (manufactured by Eyegraphics Co., Ltd.) at 160 W/cm under purging with nitrogen such that an atmosphere with an oxygen concentration of 1.0% by volume or less was formed, thereby forming an optically anisotropic layer and decomposing the cleavage group in the specific compound K1. In addition, with regard to the formed optically anisotropic layer, the optical characteristics were examined by the above-mentioned method, and thus found to be a positive C-plate.

Rod-like liquid crystal compound A

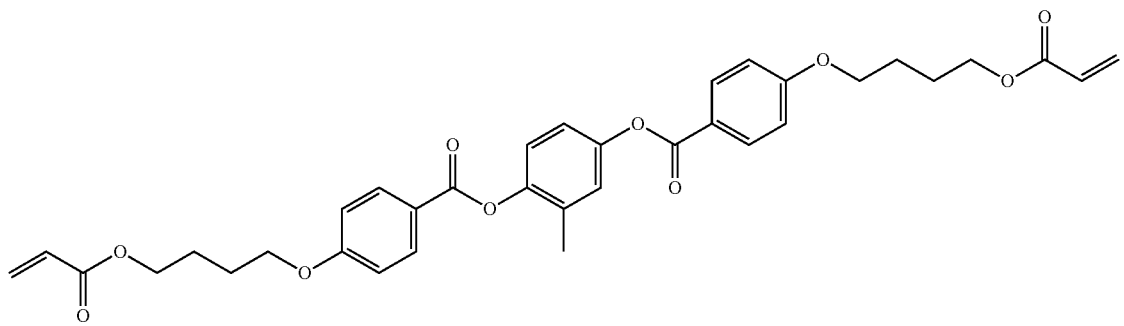

Rod-like liquid crystal compound B

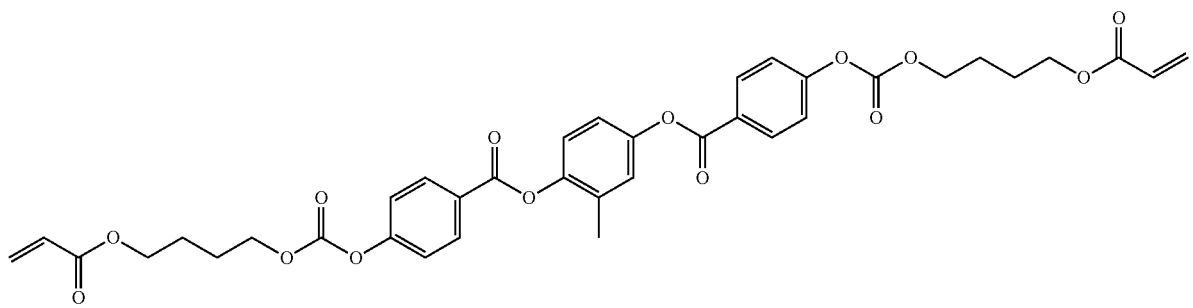

Vertically aligning agent A

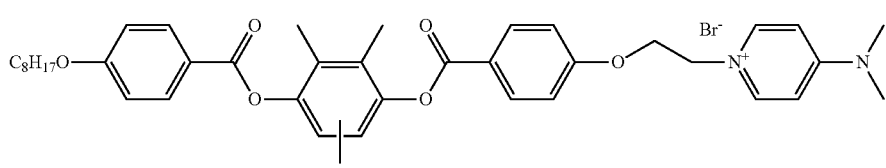

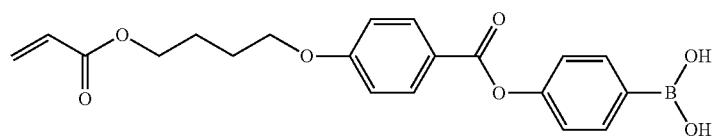

Vertically aligning agent B

Example 2

<Synthesis of Specific Compound K2>

A monomer was synthesized according to the following scheme with reference to WO2013/115195A, and thus, a specific compound K2 represented by Formula K2 was synthesized. The weight-average molecular weight (Mw) of the synthesized specific compound K2 was 37,000.

In addition, in the following scheme, compounds for introducing a fluorine atom used for the synthesis of the monomer were synthesized with reference to paragraphs [0073] to [0080] of JP2012-211306A.

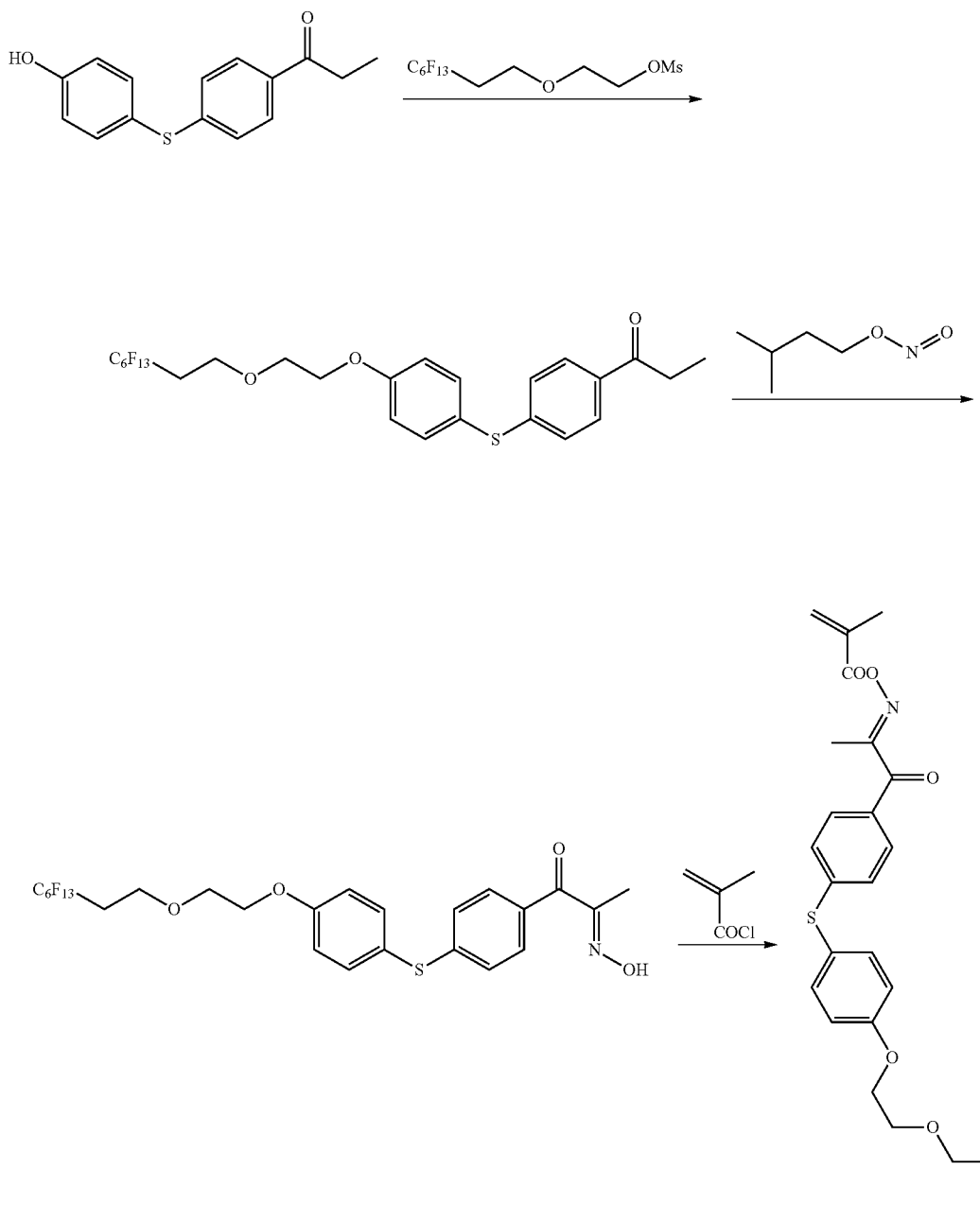

-continued

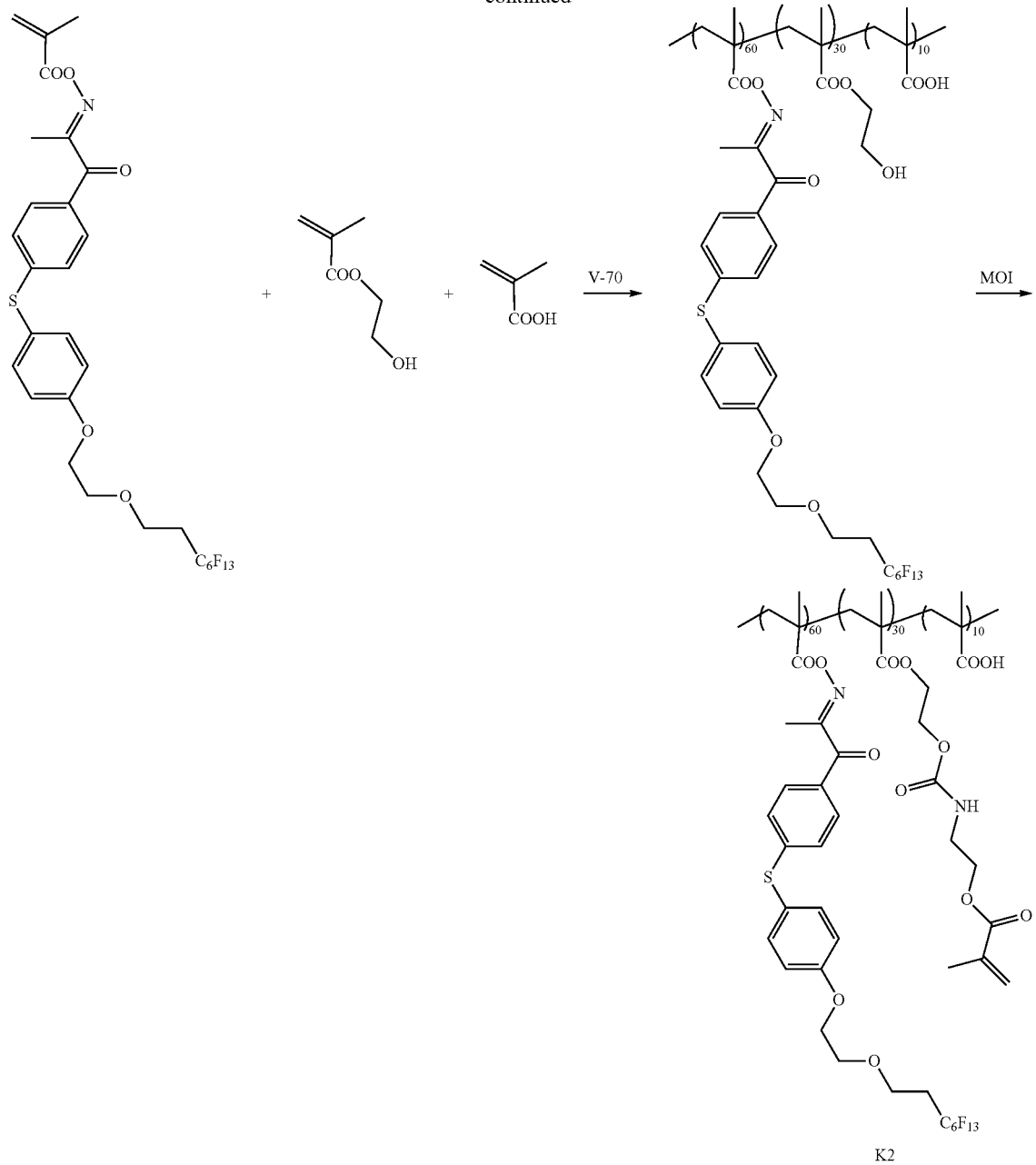

<Formation of Optically Anisotropic Layer>

An optically anisotropic layer was formed by the same method as in Example 1, except that the specific compound K2 was used instead of the specific compound K1. In addition, with regard to the formed optically anisotropic layer, the optical characteristics were examined by the above-mentioned method, and thus found to be a positive C-plate.

Example 3

<Synthesis of Specific Compound K3>

A monomer was synthesized according to the following scheme with reference to JP5983628B, and thus, a specific compound K3 represented by Formula K3 was synthesized. The weight-average molecular weight (Mw) of the synthesized specific compound K3 was 25,000.

In addition, in the following scheme, "(+)-10-Camphorsulfonic Acid" represents "(+)-10-camphorsulfonic acid" manufactured by Tokyo Chemical Industry Co., Ltd.).

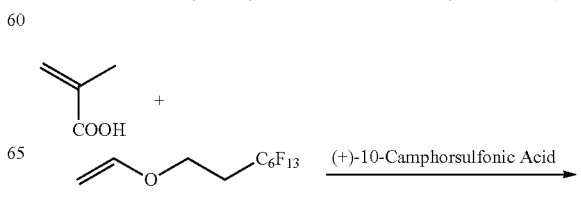

-continued

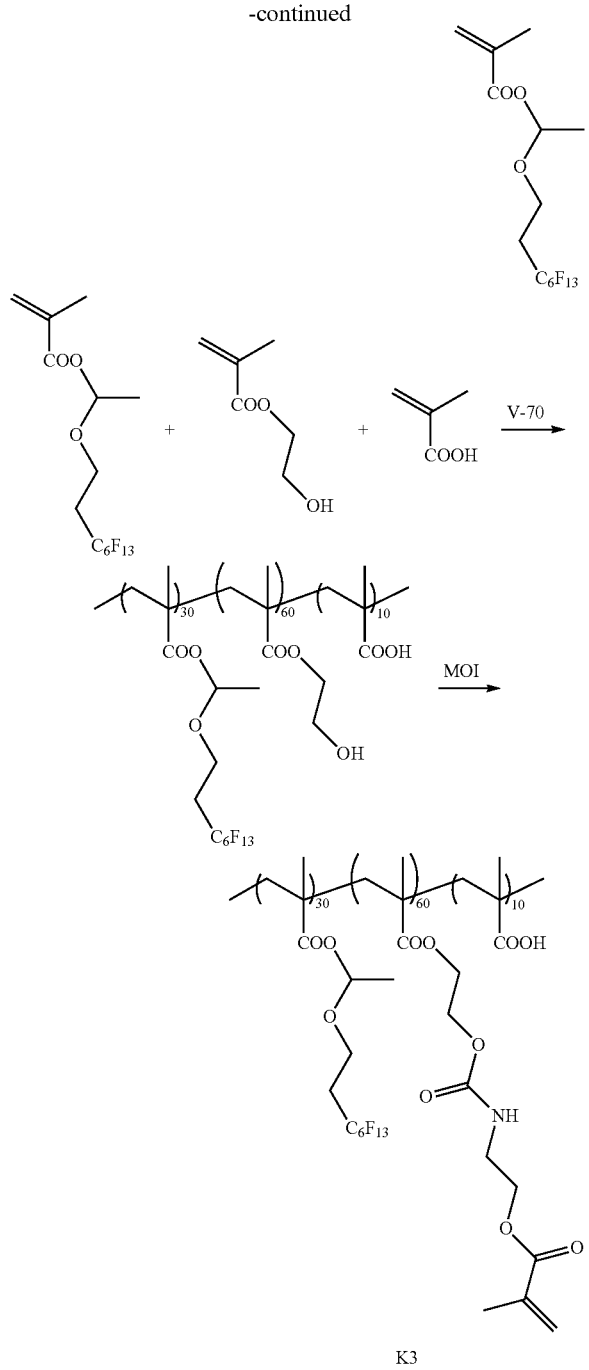

K3

<Formation of Optically Anisotropic Layer>

A solution for forming an optically anisotropic layer was prepared by the same method as in Example 1, except that the specific compound K3 was used instead of the specific compound K1 and 5.0 parts by mass of a photoacid generator represented by Formula B-1-1 was further added. In addition, Ts in Formula B-1-1 represents a tosyl group (p-toluenesulfonyl group).

The prepared solution for forming an optically anisotropic layer was applied onto the above-mentioned alignment layer Y1 with a #3.0 wire bar, heated at 70° C. for 2 minutes, cooled to 40° C., and then irradiated with ultraviolet rays at an irradiation dose of 300 mJ/cm² using an air-cooling metal halide lamp (manufactured by Eyegraphics Co., Ltd.) at 160 W/cm under purging with nitrogen such that an atmosphere with an oxygen concentration of 1.0% by volume or less was formed, thereby forming an optically anisotropic layer. Thereafter, the optically anisotropic layer was subjected to an annealing treatment at 120° C. for 1 minute to promote the decomposition of a cleavage group by an acid generated upon irradiation with ultraviolet rays during the formation of the optically anisotropic layer, thereby decomposing the cleavage group in the specific compound K3. In addition, with regard to the formed optically anisotropic layer, the optical characteristics were examined by the above-mentioned method, and thus found to be a positive C-plate.

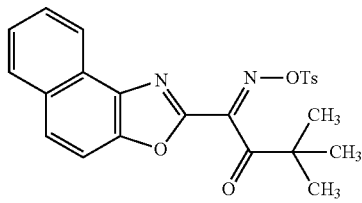

B-1-1

Example 4

<Synthesis of Specific Compound K4>

A specific compound K4 represented by Formula K4 was synthesized by the same method as in Example 1. The weight-average molecular weight (Mw) of the synthesized specific compound K4 was 34,000.

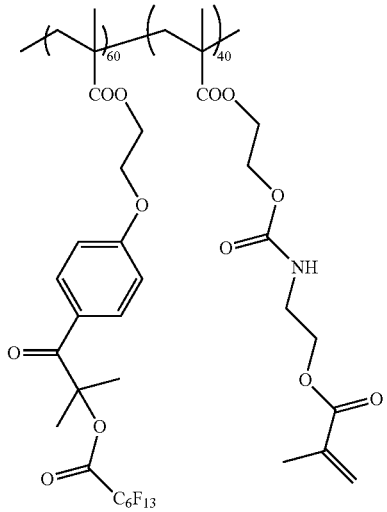

K4

<Formation of Optically Anisotropic Layer>

The rod-like liquid crystal compound A (80 parts by mass), the rod-like liquid crystal compound B (20 parts by mass), a photopolymerization initiator (IRGACURE-907, manufactured by BASF) (3 parts by mass), a sensitizer (KAYACURE DETX, manufactured by Nippon Kayaku Co., Ltd.) (1 part by mass), and the above-mentioned specific compound K4 (2.0 parts by mass) were dissolved in methyl ethyl ketone (193 parts by mass) to prepare a solution for forming an optically anisotropic layer.

The prepared solution for forming an optically anisotropic layer was applied onto the above-mentioned alignment layer Y2 with a #2.2 wire bar coater, heated at 60° C. for 2 minutes, and irradiated with ultraviolet rays at an irradiation dose of 300 mJ/cm² using an air-cooling metal halide lamp (manufactured by Eyegraphics Co., Ltd.) at 160 W/cm under purging with nitrogen such that an atmosphere with an oxygen concentration of 1.0% by volume or less while maintaining the temperature at 60° C. was formed, thereby forming an optically anisotropic layer and decomposing the cleavage group in the specific compound K4. In addition, with regard to the formed optically anisotropic layer, the optical characteristics were examined by the above-mentioned method, and thus found to be a positive A-plate.

Example 5

<Synthesis of Specific Compound K5>

A specific compound K5 represented by Formula K5 was synthesized by the same method as in Example 1. The weight-average molecular weight (Mw) of the synthesized specific compound K5 was 34,000.

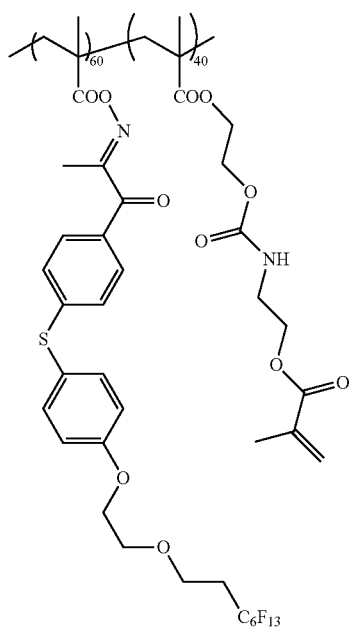

<Formation of Optically Anisotropic Layer>

An optically anisotropic layer was formed by the same method as in Example 4, except that the specific compound K5 was used instead of the specific compound K4. In addition, with regard to the formed optically anisotropic layer, the optical characteristics were examined by the above-mentioned method, and thus found to be a positive A-plate.

Example 6

<Synthesis of Specific Compound K6>

A specific compound K6 represented by Formula K6 was synthesized by the same method as in Example 3. The weight-average molecular weight (Mw) of the synthesized specific compound K6 was 28,000.

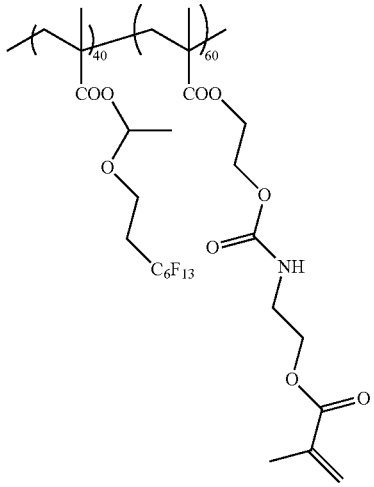

<Formation of Optically Anisotropic Layer>

A solution for forming an optically anisotropic layer was prepared by the same method as in Example 4, except that the specific compound K6 was used instead of the specific compound K4 and 5.0 parts by mass of a photoacid generator represented by Formula B-1-1 was further added.

The prepared solution for forming an optically anisotropic layer was applied onto the above-mentioned alignment layer Y2 with a #2.2 wire bar coater, heated at 60° C. for 2 minutes, and irradiated with ultraviolet rays at an irradiation dose of 300 mJ/cm² using an air-cooling metal halide lamp (manufactured by Eyegraphics Co., Ltd.) at 160 W/cm under purging with nitrogen such that an atmosphere with an oxygen concentration of 1.0% by volume or less was formed while maintaining the temperature at 60° C., thereby forming an optically anisotropic layer. Thereafter, the optically anisotropic layer was subjected to an annealing treatment at 120° C. for 1 minute to promote the decomposition of a cleavage group by an acid generated upon irradiation with ultraviolet rays during the formation of the optically anisotropic layer, thereby decomposing the cleavage group in the specific compound K6. In addition, with regard to the formed optically anisotropic layer, the optical characteristics were examined by the above-mentioned method, and thus found to be a positive A-plate.

Example 7

The following composition was put into a mixing tank and stirred to prepare a solution for forming an optically anisotropic layer for a C-plate.

Subsequently, the solution for forming an optically anisotropic layer was continuously applied onto the above-mentioned alignment layer Y1 with a #3.2 wire bar. The transportation speed (V) of the film was set to 40 μm/min. The film was heated with hot air at 60° C. for 80 seconds for the purpose of drying the solvent in the solution for forming an optically anisotropic layer and aging the alignment of the disc-like liquid crystal compound.

Then, the film was irradiated with ultraviolet rays at 70° C. with an irradiation dose of 300 mJ/cm² to fix the alignment of the liquid crystal compound, thereby forming an optically anisotropic layer and decomposing the cleavage group in the specific compound K4. In addition, with regard to the formed optically anisotropic layer, the optical characteristics were examined by the above-mentioned method, and thus found to be a negative C-plate.

| Solution for forming optically anisotropic layer | |
|---|---|
| Disc-like liquid crystal compound D1 below | 80.00 parts by mass |
| Disc-like liquid crystal compound D2 below | 20.00 parts by mass |
| Polymerizable monomer 1 below | 10.00 parts by mass |
| Polymerization initiator (IRGACURE 907, manufactured by BASF) | 3.00 parts by mass |
| Sensitizer (KAYACURE DETX-S, manufactured by Nippon Kayaku Co., Ltd.) | 1.00 part by mass |
| Specific compound K4 | 3.00 parts by mass |
| Methyl ethyl ketone | 225.00 parts by mass |
| t-Butyl alcohol | 69.00 parts by mass |
| Cyclohexanone | 52.00 parts by mass |
| Disc-like liquid crystal compound | Type |

D1

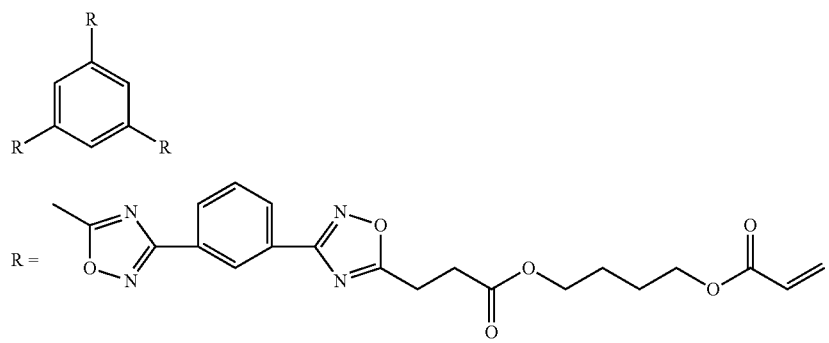

D2

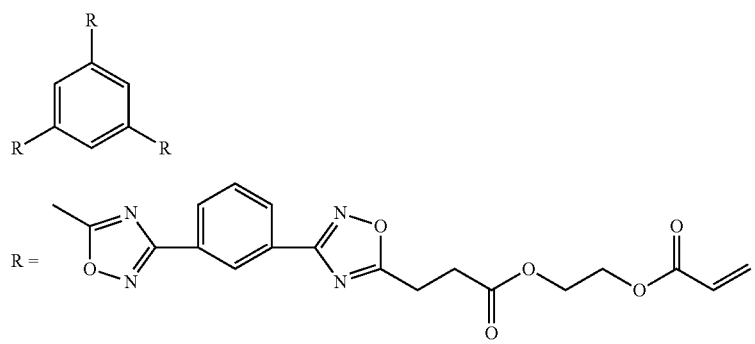

Polymerizable monomer 1

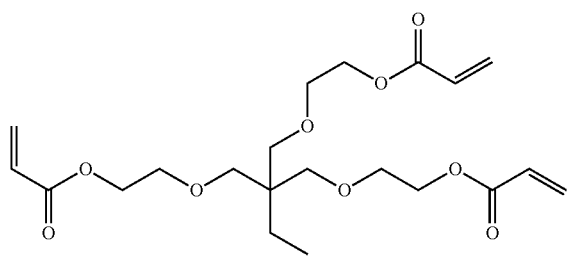 [SMILES: C=CC(=O)OCCOCC(CC)(COCCOC(=O)C=C)COCCOC(=O)C=C]

Example 8

An optically anisotropic layer was formed by the same method as in Example 7, except that the specific compound K5 was used instead of the specific compound K4. In addition, with regard to the formed optically anisotropic layer, the optical characteristics were examined by the above-mentioned method, and thus found to be a negative C-plate.

Example 9

A solution for forming an optically anisotropic layer was prepared by the same method as in Example 7, except that the specific compound K6 was used instead of the specific compound K4 and 5.0 parts by mass of a photoacid generator represented by Formula B-1-1 was further added.

Subsequently, the solution for forming an optically anisotropic layer was continuously applied onto the above-mentioned alignment layer Y1 with a #3.2 wire bar. The transportation speed (V) of the film was set to 40 μm/min. The film was heated with hot air at 60° C. for 80 seconds for the purpose of drying the solvent in the solution for forming an optically anisotropic layer and aging the alignment of the disc-like liquid crystal compound.

Then, the film was irradiated with ultraviolet rays at 70° C. with an irradiation dose of 300 mJ/cm² to fix the alignment of the liquid crystal compound, thereby forming an optically anisotropic layer. Thereafter, the optically anisotropic layer was subjected to an annealing treatment at 120° C. for 1 minute to promote the decomposition of a cleavage group by an acid generated upon irradiation with ultraviolet rays during the formation of the optically anisotropic layer, thereby decomposing the cleavage group in the specific compound K6. In addition, with regard to the formed optically anisotropic layer, the optical characteristics were examined by the above-mentioned method, and thus found to be a negative C-plate.

Example 10

The following composition was put into a mixing tank and stirred to prepare a solution for forming an optically anisotropic layer for an A-plate.

The prepared solution for forming an optically anisotropic layer was continuously applied onto the above-mentioned alignment layer Y2 with a #3.2 wire bar. The transportation speed (V) of the film was set to 40 µm/min. The film was heated with hot air at 60° C. for 80 seconds for the purpose of drying the solvent in the solution for forming an optically anisotropic layer and aging the alignment of the disc-like liquid crystal compound.

Then, the film was irradiated with ultraviolet rays at 70° C. with an irradiation dose of 300 mJ/cm$^2$ to fix the alignment of the liquid crystal compound, thereby forming an optically anisotropic layer and decomposing the cleavage group in the specific compound K1. In addition, with regard to the formed optically anisotropic layer, the optical characteristics were examined by the above-mentioned method, and thus found to be a negative A-plate.

| Solution for forming optically anisotropic layer | |
|---|---|
| Disc-like liquid crystal compound D1 below | 80.00 parts by mass |
| Disc-like liquid crystal compound D2 below | 20.00 parts by mass |
| Polymerizable monomer 1 below | 10.00 parts by mass |
| Aligning agent OA1 below | 0.90 parts by mass |
| Aligning agent OA2 below | 0.10 parts by mass |
| Polymerization initiator (IRGACURE 907, manufactured by BASF) | 3.00 parts by mass |
| Sensitizer (KAYACURE DETX-S, manufactured by Nippon Kayaku Co., Ltd.) | 1.00 part by mass |
| Specific compound K1 | 3.00 parts by mass |
| Methyl ethyl ketone | 225.00 parts by mass |
| t-Butyl alcohol | 69.00 parts by mass |
| Cyclohexanone | 52.00 parts by mass |

| Alignment agent | Type |
|---|---|
| OA1 | |
| OA2 | |

Example 11

An optically anisotropic layer was formed by the same method as in Example 10, except that the specific compound K2 was used instead of the specific compound K1. In addition, with regard to the formed optically anisotropic layer, the optical characteristics were examined by the above-mentioned method, and thus found to be a negative A-plate.

Example 12

A solution for forming an optically anisotropic layer was prepared by the same method as in Example 10, except that the specific compound K3 was used instead of the specific compound K1 and 5.0 parts by mass of a photoacid generator represented by Formula B-1-1 was further added.

The prepared solution for forming an optically anisotropic layer was continuously applied onto the above-mentioned alignment layer Y2 with a #3.2 wire bar. The transportation speed (V) of the film was set to 40 µm/min. The film was heated with hot air at 60° C. for 80 seconds for the purpose of drying the solvent in the solution for forming an optically anisotropic layer and aging the alignment of the disc-like liquid crystal compound.

Then, the film was irradiated with ultraviolet rays at 70° C. with an irradiation dose of 300 mJ/cm² to fix the alignment of the liquid crystal compound, thereby forming an optically anisotropic layer. Thereafter, the optically anisotropic layer was subjected to an annealing treatment at 120° C. for 1 minute to promote the decomposition of a cleavage group by an acid generated upon irradiation with ultraviolet rays during the formation of the optically anisotropic layer, thereby decomposing the cleavage group in the specific compound K3. In addition, with regard to the formed optically anisotropic layer, the optical characteristics were examined by the above-mentioned method, and thus found to be a negative A-plate.

Comparative Example 1

<Synthesis of Surfactant S1>

A surfactant S1 represented by Formula S1 was synthesized according to the following scheme. The weight-average molecular weight (Mw) of the synthesized surfactant S130 was 30,000.

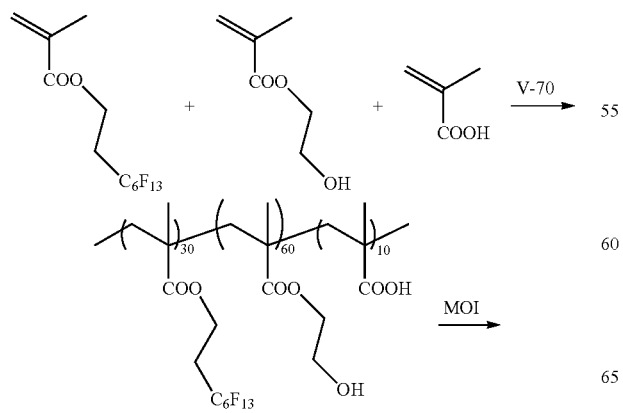

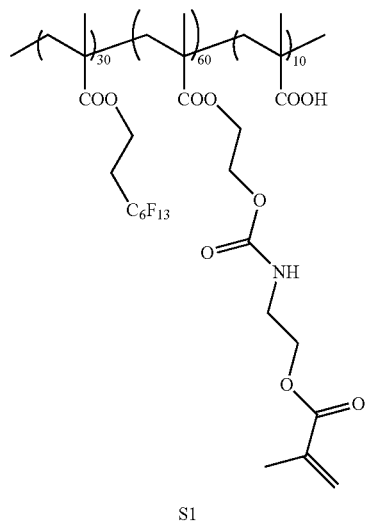

S1

<Formation of Optically Anisotropic Layer>

An optically anisotropic layer was formed by the same method as in Example 1, except that the surfactant S1 was used instead of the specific compound K1. In addition, with regard to the formed optically anisotropic layer, the optical characteristics were examined by the above-mentioned method, and thus found to be a positive C-plate.

Comparative Example 2

<Synthesis of Surfactant S2>

A surfactant S2 represented by Formula S2 was synthesized according to the following scheme. The weight-average molecular weight (Mw) of the synthesized surfactant S2 was 33,000.

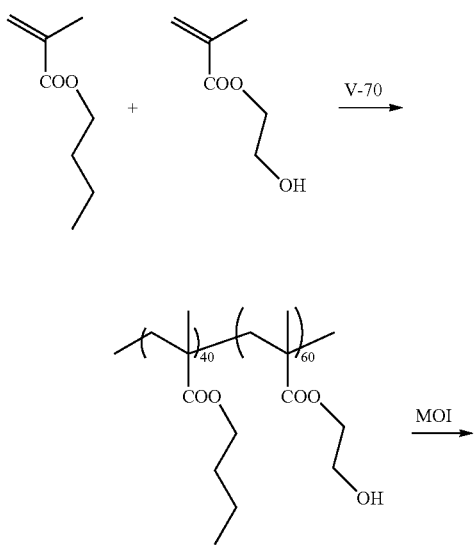

-continued

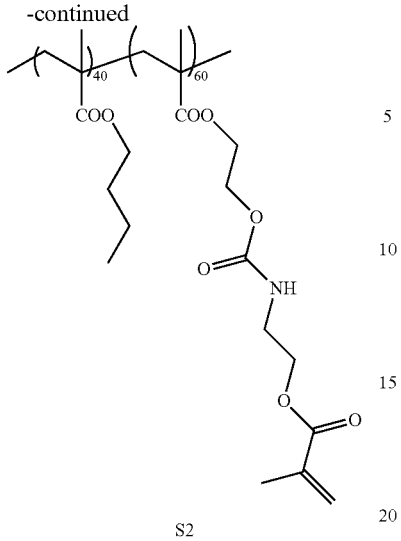

S2

<Formation of Optically Anisotropic Layer>

An optically anisotropic layer was formed by the same method as in Example 1, except that the surfactant S2 was used instead of the specific compound K4. In addition, with regard to the formed optically anisotropic layer, the optical characteristics were examined by the above-mentioned method, and thus found to be a positive A-plate.

Comparative Example 3

<Synthesis of Surfactant S3>

A surfactant S3 represented by Formula S3 was synthesized by the same method as in Comparative Example 1. The weight-average molecular weight (Mw) of the synthesized surfactant S3 was 35,000.

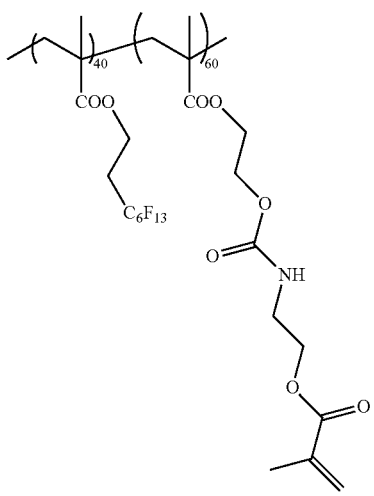

S3

<Formation of Optically Anisotropic Layer>

An optically anisotropic layer was formed by the same method as in Example 7, except that the surfactant S3 was used instead of the specific compound K4. In addition, with regard to the formed optically anisotropic layer, the optical characteristics were examined by the above-mentioned method, and thus found to be a negative C-plate.

Comparative Example 4

<Synthesis of Surfactant S4>

A surfactant S4 represented by Formula S4 was synthesized by the same method as in Comparative Example 2. The weight-average molecular weight (Mw) of the synthesized surfactant S4 was 32,000.

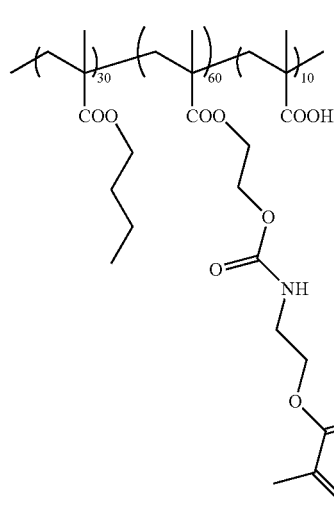

S4

<Formation of Optically Anisotropic Layer>

An optically anisotropic layer was formed by the same method as in Example 10, except that the surfactant S4 was used instead of the specific compound K1. In addition, with regard to the formed optically anisotropic layer, the optical characteristics were examined by the above-mentioned method, and thus found to be a negative A-plate.

[Liquid Crystal Alignment Properties]

Two sheets of polarizing plates were arranged in the state of a cross nicol, a sample formed from the optically anisotropic layer was arranged therebetween, and a degree of light leakage was observed and evaluated according to the following standard. The results are shown in Table 1 below.

In addition, the sample of the A-plate was observed at an azimuth angle at which it was the darkest, and the sample of the C-plate was observed without particular adjustment of the azimuth angle.

<Evaluation Standard>

A: There is no light leakage.
B: There is substantially no light leakage.
C: Light leakage is observed.

[Cissing]

For each of the optically anisotropic layers formed in Examples and Comparative Examples, a surface area in A4 size was examined, a failure appearing to be a loss in a circular or elliptical shape was regarded as cissing, and evaluation was performed according to the following standard. The results are shown in Table 1 below.

<Evaluation Standard>

A: Zero or one failure is observed.
B: Two to four failures are observed.
C: Five or more failures are observed.

[Wind Unevenness]

Two sheets of polarizing plates were arranged in the state of a cross nicol, a sample formed from the optically anisotropic layer was arranged therebetween, presence or absence of stripped irregularity was observed, and evaluation of the wind unevenness was performed according to the following standard. The results are shown in Table 1 below.

In addition, the sample of the A-plate was observed at the horizontal with respect to the polarizing plate surface, and the sample of the C-plate was observed in the oblique with respect to the polarizing plate surface.

<Evaluation Standard>
A: Unevenness is not visually recognized.
B: Unevenness is substantially not visually recognized.
C: Unevenness can be visually recognized.

[Upper Layer Coating Properties]

The surface energy of each of the optically anisotropic layers formed in Examples and Comparative Examples was measured and the upper layer coating properties were evaluated according to the following standard. The results are shown in Table 1 below.

<Evaluation Standard>
A: 45 mN/m or more
B: 40 mN/m or more and less than 45 mN/m
C: 30 mN/m or more and less than 40 mN/m
D: Less than 30 mN/m In contrast, it could be seen that in a case of using the specific compound, the coating properties (cissing) during formation of the optically anisotropic layer are excellent, the wind unevenness can be suppressed, and the coating properties of the formed optically anisotropic layer with respect to the upper layer coating liquid are also good (Examples 1 to 12).

What is claimed is:

1. A polymerizable liquid crystal composition comprising:
   a polymerizable liquid crystal compound;
   a polymerization initiator; and
   a polymer having a monovalent specific group, in a side chain, including a cleavage group capable of decomposing by an action of at least one selected from the group consisting of light, heat, an acid, and a base to generate a polar group,
   wherein the specific group has a fluorine atom or a silicon atom on a side closer to a terminal than the cleavage group in the side chain.

2. The polymerizable liquid crystal composition according to claim 1,
   wherein the polymer is a polymer having a repeating unit represented by Formula (1) or a repeating unit represented by Formula (2-1) or (2-2),

TABLE 1

| | | Specific compound and the like | Optically anisotropic layer | | Evaluation | | |
| --- | --- | --- | --- | --- | --- | --- | --- |
| | Liquid crystal compound | | Alignment properties | Alignment state | Cissing | Wind unevenness | Upper layer coating properties |
| Example 1 | Rod-like liquid crystal compound A, B | K1 | A | C-plate | A | A | A |
| Example 2 | Rod-like liquid crystal compound A, B | K2 | A | C-plate | A | A | A |
| Example 3 | Rod-like liquid crystal compound A, B | K3 | A | C-plate | A | A | A |
| Example 4 | Rod-like liquid crystal compound A, B | K4 | A | A-plate | A | A | A |
| Example 5 | Rod-like liquid crystal compound A, B | K5 | A | A-plate | A | A | A |
| Example 6 | Rod-like liquid crystal compound A, B | K6 | A | A-plate | A | A | A |
| Example 7 | Disc-like liquid crystal compound D1, D2 | K4 | A | C-plate | A | A | A |
| Example 8 | Disc-like liquid crystal compound D1, D2 | K5 | A | C-plate | A | A | A |
| Example 9 | Disc-like liquid crystal compound D1, D2 | K6 | A | C-plate | A | A | A |
| Example 10 | Disc-like liquid crystal compound D1, D2 | K1 | A | A-plate | A | A | A |
| Example 11 | Disc-like liquid crystal compound D1, D2 | K2 | A | A-plate | A | A | A |
| Example 12 | Disc-like liquid crystal compound D1, D2 | K3 | A | A-plate | A | A | A |
| Comparative Example 1 | Rod-like liquid crystal compound A, B | S1 | A | C-plate | A | B | D |
| Comparative Example 2 | Rod-like liquid crystal compound A, B | S2 | A | A-plate | C | A | B |
| Comparative Example 3 | Disc-like liquid crystal compound D1, D2 | S3 | A | C-plate | A | B | D |
| Comparative Example 4 | Disc-like liquid crystal compound D1, D2 | S4 | A | A-plate | C | A | B |

From the results shown in Table 1, it could be seen that in a case of using the surfactants S1 to S4 known in the related art, the coating properties (cissing) during formation of the optically anisotropic layer and the coating properties of the formed optically anisotropic layer with respect to the upper layer coating liquid cannot be satisfied at the same time (Comparative Examples 1 to 4).

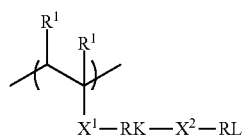

(1)

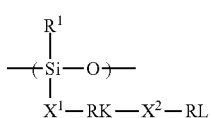
(2-1)

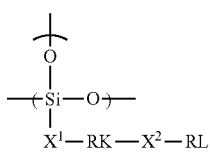
(2-2)

in Formulae (1) and (2-1), $R^1$ represents a hydrogen atom or an alkyl group having 1 to 3 carbon atoms, and a plurality of $R^1$'s in Formula (1) may be the same as or different from each other, and in Formulae (1), (2-1), and (2-2), $X^1$ and $X^2$ each independently represent a single bond or a divalent linking group, RK represents a cleavage group, and RL represents a monovalent organic group including a fluorine atom or a silicon atom.

3. The polymerizable liquid crystal composition according to claim 2,
   wherein RK in Formulae (1), (2-1), and (2-2) is a cleavage group represented by any one of Formula (rk-1), ..., or (rk-13),

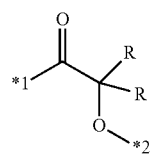
(rk-1)

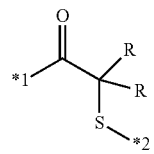
(rk-2)

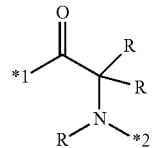
(rk-3)

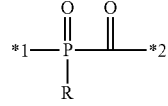
(rk-4)

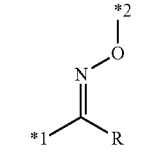
(rk-5)

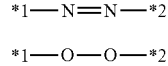
(rk-6)

(rk-7)

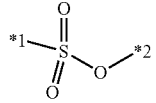
(rk-8)

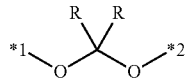
(rk-9)

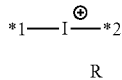
(rk-10)

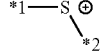
(rk-11)

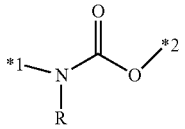
(rk-12)

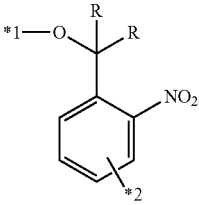
(rk-13)

in Formulae (rk-1) to (rk-13), *1 represents a binding position to any one of $X^1$ or $X^2$ in Formulae (1), (2-1), and (2-2), *2 represents a binding position to the other of $X^1$ or $X^2$ not bonded to *1 in Formulae (1), (2-1), and (2-2), and R's each independently represent a hydrogen atom or a monovalent organic group.

4. The polymerizable liquid crystal composition according to claim 1,
   wherein the polymer is a polymer having a repeating unit represented by Formula (3),

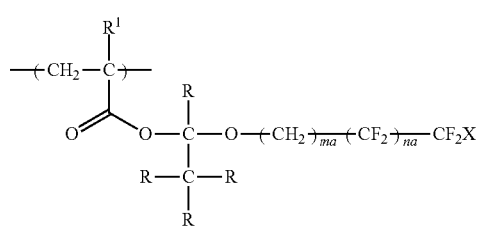
(3)

in Formula (3), $R^1$ represents a hydrogen atom or an alkyl group having 1 to 3 carbon atoms, R represents a hydrogen atom or a monovalent organic group, X represents a hydrogen atom or a fluorine atom, ma and na each independently represent an integer of 1 to 20, and a plurality of R's may be the same as or different from each other.

5. An optically anisotropic layer formed using the polymerizable liquid crystal composition according to claim 1.

6. An optically anisotropic layer formed using the polymerizable liquid crystal composition according to claim 2.

7. An optically anisotropic layer formed using the polymerizable liquid crystal composition according to claim 3.

8. An optically anisotropic layer formed using the polymerizable liquid crystal composition according to claim 4.

9. An optical laminate comprising:
the optically anisotropic layer according to claim 5; and
an upper layer provided on the optically anisotropic layer,
wherein the optically anisotropic layer and the upper layer are laminated in adjacent to each other.

10. An optical laminate comprising:
a support;
a first optically anisotropic layer provided on the support; and
a second optically anisotropic layer provided on the first optically anisotropic layer,
wherein the first optically anisotropic layer is the optically anisotropic layer according to claim 5, and
the first optically anisotropic layer and the second optically anisotropic layer are laminated in adjacent to each other.

11. The optical laminate according to claim 10,
wherein the second optically anisotropic layer is formed using a polymerizable liquid crystal composition containing a polymerizable liquid crystal compound.

12. An image display device comprising:
the optically anisotropic layer according to claim 5.

13. An image display device comprising:
the optical laminate according to claim 9.

14. An image display device comprising:
the optical laminate according to claim 10.

* * * * *